(12) United States Patent
Ratnam et al.

(10) Patent No.: US 12,199,724 B2
(45) Date of Patent: Jan. 14, 2025

(54) SYSTEM AND METHOD FOR TIME-DELAY BASED HYBRID BEAMFORMING

(71) Applicant: Samsung Electronics Co., Ltd., Suwon-si (KR)

(72) Inventors: Vishnu Vardhan Ratnam, Plano, TX (US); Shadi Abu-Surra, Plano, TX (US); Jianhua Mo, Allen, TX (US); Gang Xu, Allen, TX (US); Jin Yuan, Plano, TX (US); Ahmad AlAmmouri, Garland, TX (US); Boon Loong Ng, Plano, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 18/047,963

(22) Filed: Oct. 19, 2022

(65) Prior Publication Data

US 2023/0136372 A1 May 4, 2023

Related U.S. Application Data

(60) Provisional application No. 63/337,496, filed on May 2, 2022, provisional application No. 63/273,786, filed on Oct. 29, 2021.

(51) Int. Cl.
*H04B 7/06* (2006.01)
*H04B 7/01* (2006.01)
*H04B 7/0408* (2017.01)

(52) U.S. Cl.
CPC .............. *H04B 7/0667* (2013.01); *H04B 7/01* (2013.01); *H04B 7/0408* (2013.01)

(58) Field of Classification Search
CPC ...... H04B 7/0667; H04B 7/01; H04B 7/0408; H04B 7/0695; H04B 7/0617
(Continued)

(56) References Cited

U.S. PATENT DOCUMENTS 9,172,569 B2 10/2015 Leenaerts et al.
9,444,532 B1 9/2016 Sayeed et al.
(Continued)

FOREIGN PATENT DOCUMENTS

CN 112636773 B 12/2021
WO 2017153985 A1 9/2017
WO 2021170204 A1 9/2021

OTHER PUBLICATIONS

Gao et al., "Wideband Beamforming for Hybrid Massive MIMO Terahertz Communications", IEEE Journal on Selected Areas in Communications, vol. 39, No. 6, Jun. 2021, pp. 1725-1740.
(Continued)

*Primary Examiner* — Fitwi Y Hailegiorgis

(57) ABSTRACT

A method includes determining one or more delay values and one or more phase shift values for generation of multiple desired frequency-dependent analog beams. The method also includes configuring one or more true-time delay (TTD) elements and one or more phase shifters of a transceiver based on the one or more delay values and the one or more phase shift values, the transceiver having one or more radio-frequency (RF) chains connected to multiple antennas via the one or more TTD elements and the one or more phase shifters. The method also includes operating the transceiver to generate the multiple desired frequency-dependent analog beams.

20 Claims, 38 Drawing Sheets

(58) Field of Classification Search
USPC .......................................................... 375/267
See application file for complete search history.

(56) References Cited

U.S. PATENT DOCUMENTS

| | | | |
|---|---|---|---|
| 9,479,232 | B1 | 10/2016 | Loui et al. |
| 10,673,587 | B2 | 6/2020 | Nilsson |
| 10,700,426 | B2 | 6/2020 | Haziza et al. |
| 11,165,151 | B2 | 11/2021 | Runyon |
| 2014/0241463 | A1 | 8/2014 | Leenaerts et al. |
| 2019/0081693 | A1* | 3/2019 | Eitan ................ H04B 7/0874 |
| 2019/0089434 | A1 | 3/2019 | Rainish et al. |
| 2020/0174114 | A1 | 6/2020 | Roemer |
| 2021/0167996 | A1 | 6/2021 | Ratnam et al. |
| 2021/0344400 | A1 | 11/2021 | Gupta et al. |

OTHER PUBLICATIONS

International Search Report and Written Opinion issued Feb. 2, 2023 regarding International Application No. PCT/KR2022/016487, 7 pages.
Gao et al., "Wideband Beamforming for Hybrid Massive MIMO Terahertz Communications", IEEE Journal on Selected Areas in Communications, vol. 39, No. 6, Apr. 2021, pp. 1725-1740.
Liao et al., "Terahertz ultra-massive MIMO-based aeronautical communications in space-air ground integrated networks", arXiv:2103.01829v2, Mar. 2021, 26 pages.
V. Boljanovic et al., "Fast Beam Training With True-Time-Delay Arrays in Wideband Millimeter-Wave Systems," IEEE Transactions on Circuits and Systems I: Regular Papers, vol. 68, No. 4, Apr. 2021, 13 pages.
E. Ghaderi et al., "An Integrated Discrete-Time Delay-Compensating Technique for Large-Array Beamformers," IEEE Transactions on Circuits and Systems I: Regular Papers, vol. 66, No. 9, Sep. 2019, 11 pages.
V. Boljanovic et al., "Design of Millimeter-Wave Single-Shot Beam Training for True-Time-Delay Array," 2020 IEEE 21st International Workshop on Signal Processing Advances in Wireless Communications (SPAWC), May 4, 2020, 5 pages.
H. Yan et al., "Wideband Millimeter-Wave Beam Training with True-Time-Delay Array Architecture," 2019 53rd Asilomar Conference on Signals, Systems, and Computers, Dec. 3, 2019, 6 pages.
A. Molisch et al., "Hybrid Beamforming for Massive MIMO: A Survey," IEEE Communications Magazine, vol. 55, No. 9, Apr. 30, 2017, 13 pages.
V. Ratnam et al., "Hybrid Beamforming With Selection for Multiuser Massive MIMO Systems," IEEE Transactions on Signal Processing, vol. 66, No. 15, May 8, 2018, 16 pages.
V. Ratnam et al., "Periodic Analog Channel Estimation Aided Beamforming for Massive MIMO Systems," IEEE Transactions on Wireless Communications, vol. 18, No. 3, Mar. 2019, 14 pages.
V. Ratnam et al., "Continuous Analog Channel Estimation-Aided Beamforming for Massive MIMO Systems," IEEE Transactions on Wireless Communications, vol. 18, No. 12, Aug. 22, 2019, 14 pages.
Extended European Search Report issued Aug. 19, 2024 regarding Application No. 22887613.2, 12 pages.
Dai et al., "Delay-Phase Precoding for Wideband THz Massive MIMO", arXiv:2102.05211v1, Feb. 2021, 37 pages.

* cited by examiner

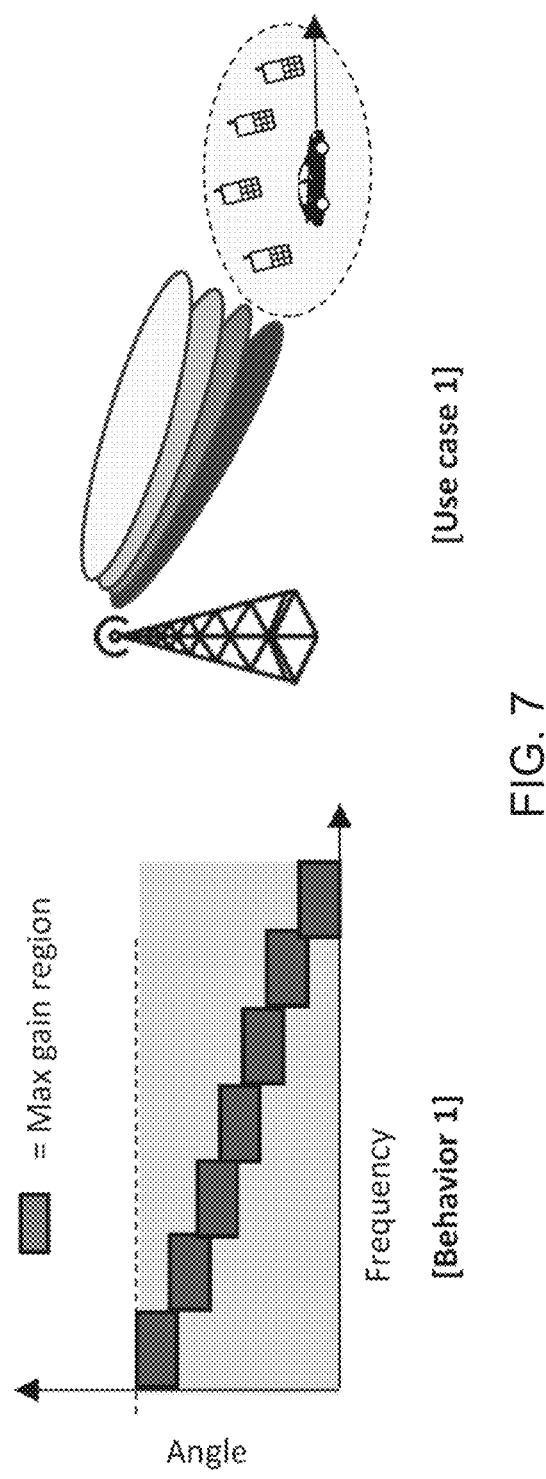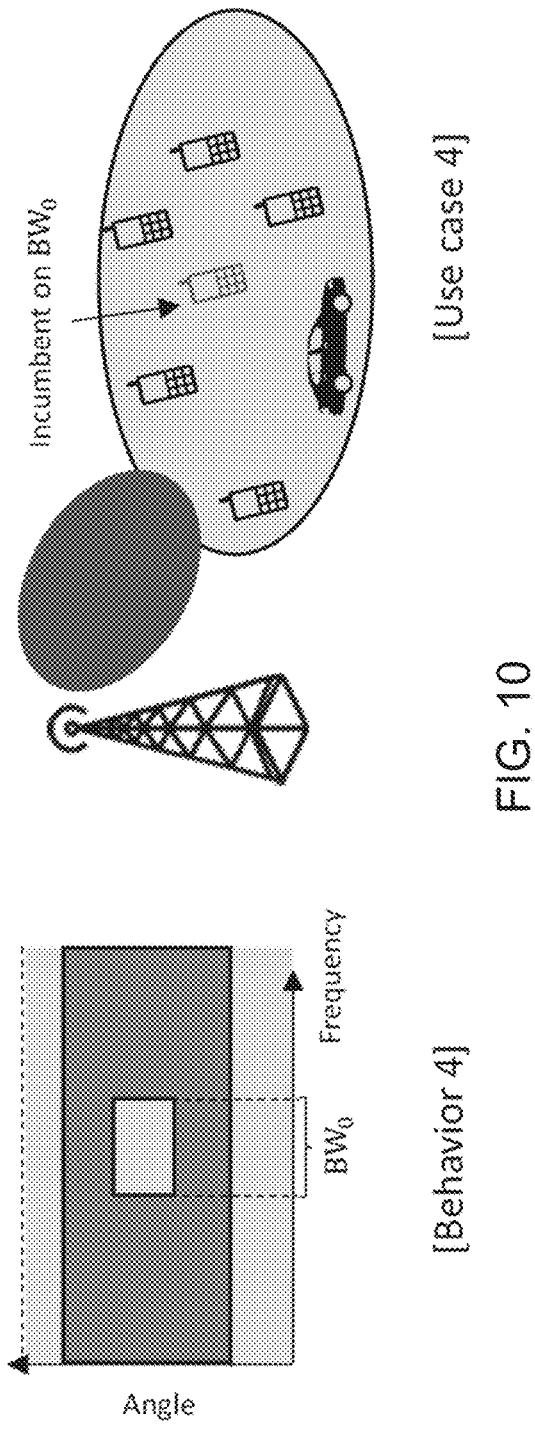
FIG. 7
FIG. 10

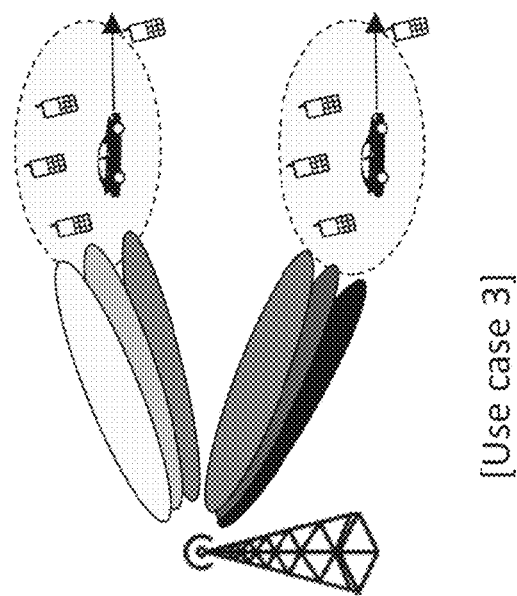
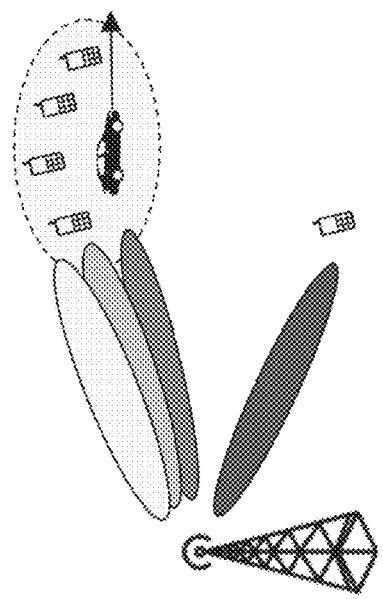
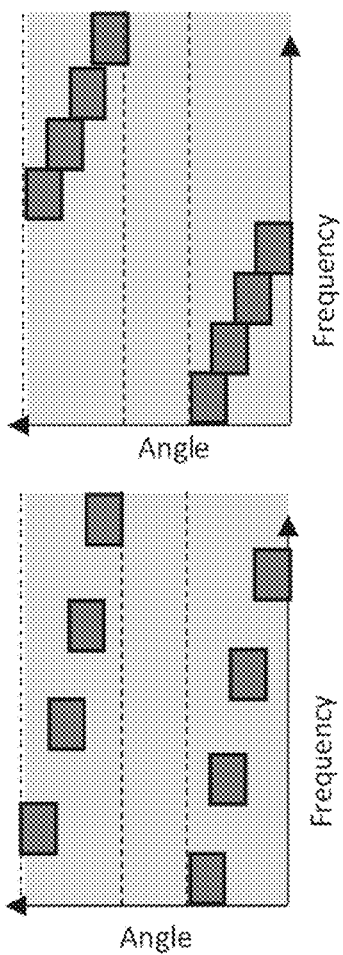
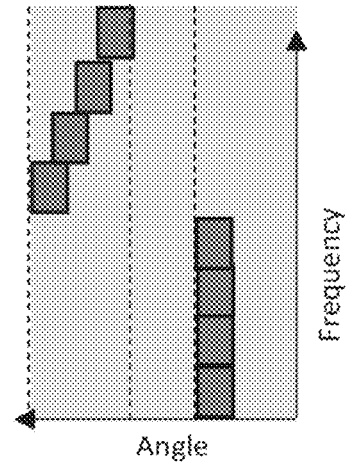
FIG. 9

1300

Inputs: $M, W, \theta_1, \Delta\theta_1$.

Calculate the array response vector: $\boldsymbol{a}_{tx}(\theta_1)$

For $m = 1:1:M$ $$\tau_{m,1} = (m-1)\frac{|\sin(\theta_1 + \Delta\theta_1) - \sin(\theta_1)|}{W}$$

$$\varphi_{m,1} = \text{mod}(-\angle[\boldsymbol{a}_{tx}(\theta_1)]_m + 2\pi\tau_{m,1}f_c, 2\pi)$$

// where $\angle[\boldsymbol{a}_{tx}(\theta_1)]_m$ represents the phase of the m-th component of the array response vector and $f_c$ is the center frequency of the transmit signal (i.e., carrier frequency).

end For

Inputs: $M, \bar{M}, W, \theta_1, \Delta\theta_1$

Calculate the array response vector: $a_{tx}(\theta_1)$

Set $U = \lceil M/\bar{M} \rceil$

For $u = 1:1:U$ $$\tilde{\tau}_u = \frac{(u-1)\bar{M}|\sin(\theta_1+\Delta\theta_1)-\sin(\theta_1)|}{W}$$

endFor

For $m = 1:1:M$ $$\hat{\tau}_m = \mathrm{mod}(m-1, \bar{M})\frac{|\sin(\theta_1+\Delta\theta_1)-\sin(\theta_1)|}{W}$$

$$\tau_{m,1} = \hat{\tau}_m + \tilde{\tau}_{\lceil m/\bar{M}\rceil}$$

$$\varphi_{m,1} = \mathrm{mod}(-\angle[a_{tx}(\theta_1)]_m + 2\pi\tau_{m,1}f_c,\ 2\pi).$$

// where $\angle[a_{tx}(\theta_1)]_m$ represents the phase of the m-th component of the array response vector and $f_c$ is the center frequency of the transmit signal (i.e., carrier frequency).

endFor

FIG. 16

Inputs: $M, \bar{M}, W, \theta_1, \Delta\theta_1$

Calculate the array response vector: $\boldsymbol{a}_{tx}(\theta_1)$

Set $N = \lceil M/\bar{M} \rceil$

For $n = 1:1:N$ $$\tau_{n,1} = \frac{(n-1/2)\bar{M}|\sin(\theta_1 + \Delta\theta_1) - \sin(\theta_1)|}{W}$$

endFor

For $m = 1:1:M$ $$\varphi_{m,1} = \mathrm{mod}(-\angle[\boldsymbol{a}_{tx}(\theta_1)]_m + 2\pi\tau_{\lceil m/\bar{M}\rceil,1} f_c, 2\pi).$$

// where $\angle[\boldsymbol{a}_{tx}(\theta_1)]_m$ represents the phase of the m-th component of the array response vector and $f_c$ is the center frequency of the transmit signal (i.e., carrier frequency).

endFor

Inputs: $M, W, \theta_1, \theta_2$

Calculate the array response vectors: $a_{tx}(\theta_1), a_{tx}(\theta_2)$

For $l = 1:1:L$ $$\tau_{1,l} = \frac{(l-1)}{W}$$

For $m = 1:1:M$ $$\varphi_{m,l} = \text{mod}\left(-\angle\left[e^{\frac{-jl\pi}{2}}a_{tx}(\theta_1) + e^{\frac{jl\pi}{2}}a_{tx}(\theta_2)\right]_m + 2\pi\tau_{1,l}f_c, 2\pi\right).$$

// where $\angle[a]_m$ represents the phase of the m-th component of a vector $a$ and $f_c$ is the center frequency of the transmit signal (i.e., carrier frequency).

endFor endFor

FIG. 22

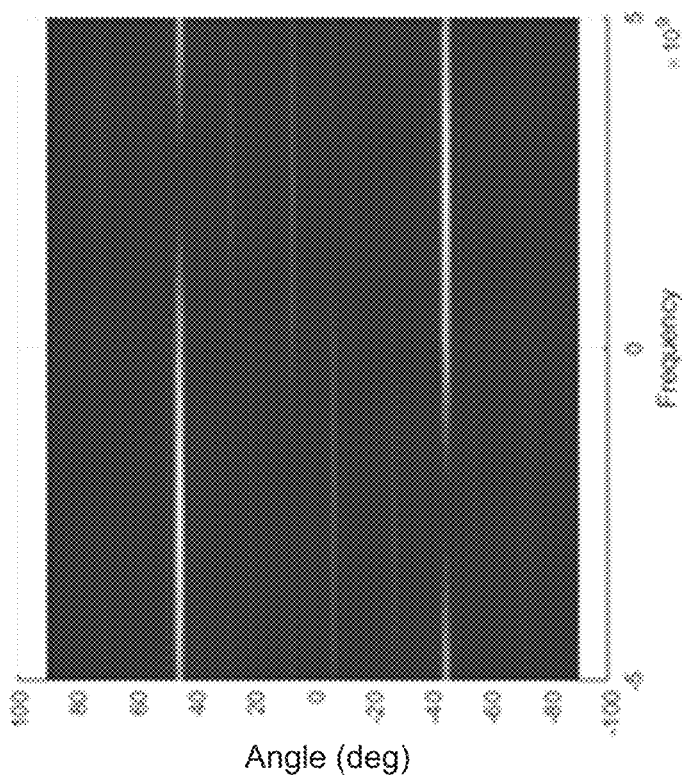
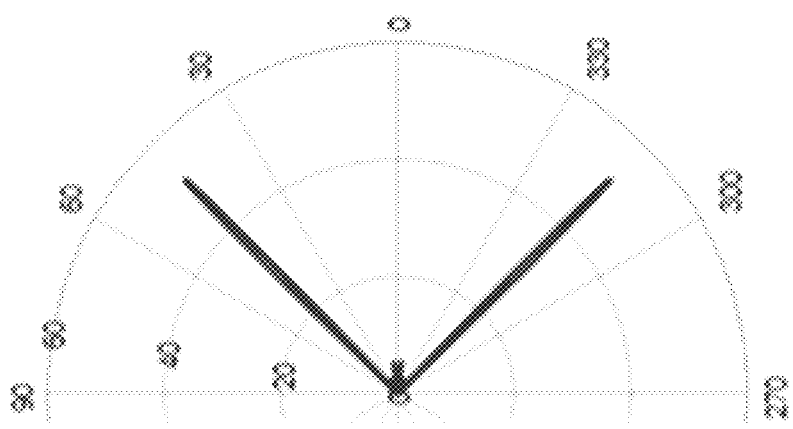
FIG. 23

Inputs: $M, W, \theta_1, \theta_2$

Calculate the vector: $\boldsymbol{a} = \boldsymbol{a}_{tx}(\theta_1) + \boldsymbol{a}_{tx}(\theta_2)$

For $m = 1:1:M$ $$\tau_{m,1} = 3\frac{\text{mod}\{\angle[\boldsymbol{a}_{tx}(\theta_1)]_m - \angle[\boldsymbol{a}]_m + \pi, 2\pi\} - \pi}{2\pi W}$$

$$\varphi_{m,1} = \text{mod}(-\angle[\boldsymbol{a}]_m + 2\pi\tau_{m,1}f_c, 2\pi)$$

// where $\angle[\boldsymbol{a}_{tx}(\theta_1)]_m$ represents the phase of the m-th component of the array response vector and $f_c$ is the center frequency of the transmit signal (i.e., carrier frequency).

endFor

$\tau_{m,1} = \tau_{m,1} - \min_{1 \leq v \leq M}\{\tau_{v,1}\}$.

Inputs: $M, N, W, \theta_1, \theta_2$

Calculate the vector: $\boldsymbol{a} = \boldsymbol{a}_{tx}(\theta_1) + \boldsymbol{a}_{tx}(\theta_2)$ For $m = 1:1:M$ $$\hat{\tau}_{m,1} = 3\frac{\text{mod}(\angle \boldsymbol{a}_{tx}(\theta_1)]_m - \angle[\boldsymbol{a}]_m + \pi, 2\pi) - \pi}{2\pi W}$$

endFor $\hat{\tau}_{m,1} = \hat{\tau}_{m,1} - \min_{1 \le v \le M}\{\hat{\tau}_{v,1}\}$.

For $m = 1:1:M$

Find: $n^* = \underset{1 \le n \le N}{\arg\min}|\hat{\tau}_{m,1} - \tau_{n,1}|$

Set switch to connect the phase-shifter of $m$-th antenna to TTD $n^*$ $\varphi_{m,1} = \text{mod}(-\angle[\boldsymbol{a}]_m + 2\pi\tau_{n^*,1}f_c, 2\pi)$ // where $\angle[\boldsymbol{a}_{tx}(\theta_1)]_m$ represents the phase of the $m$-th component of the array response vector and $f_c$ is the center frequency of the transmit signal (i.e., carrier frequency).

endFor

FIG. 27

Inputs: $M, W, \theta_1, \theta_2$

Calculate the array response vectors: $\mathbf{a}_{tx}(\theta_1), \mathbf{a}_{tx}(\theta_2)$

For $l = 1:1:2$

For $v = 1:1:2$ $$\bar{\tau}_l = \frac{2\varsigma(l-1)}{W}$$

$$\bar{\varphi}_{u,v} = \frac{v\pi}{2}(-1)^l + 2\pi\bar{\tau}_l f_c.$$

endFor

For $m = 1:1:M$ $$\hat{\tau}_{m,l} = (m-1)\frac{|\sin(\theta_l + \Delta\theta_l) - \sin(\theta_l)|}{W}$$

$$\varphi_{m,l} = \text{mod}(-\angle[\mathbf{a}_{tx}(\theta_l)]_m + 2\pi\hat{\tau}_{m,l} f_c, \ 2\pi).$$

endFor endFor

FIG. 30

Inputs: $M, W, \theta_1, \theta_2$

Calculate the array response vectors: $a_{tx}(\theta_1), a_{tx}(\theta_2)$

For $l = 1:1:2$ $$\bar{\tau}_l = \frac{25(l-1)}{W}$$

For $m = 1:1:M$ $$\hat{t}_{m,l} = (m-1)\frac{|\sin(\theta_1+\Delta\theta)-\sin(\theta_1)|+|\sin(\theta_2+\Delta\theta)-\sin(\theta_2)|}{2W}$$

$$\varphi_{m,l} = \mathrm{mod}\left(-\angle\left[e^{\frac{-jl\pi}{2}}a_{tx}(\theta_1) + e^{\frac{jl\pi}{2}}a_{tx}(\theta_2)\right]_m + 2\pi(\bar{\tau}_l + \hat{t}_{m,l})f_c,\ 2\pi\right).$$

// where $\angle[a]_m$ represents the phase of the m-th component of a vector $a$ and $f_c$ is the center frequency of the transmit signal (i.e., carrier frequency).

endFor endFor

FIG. 33

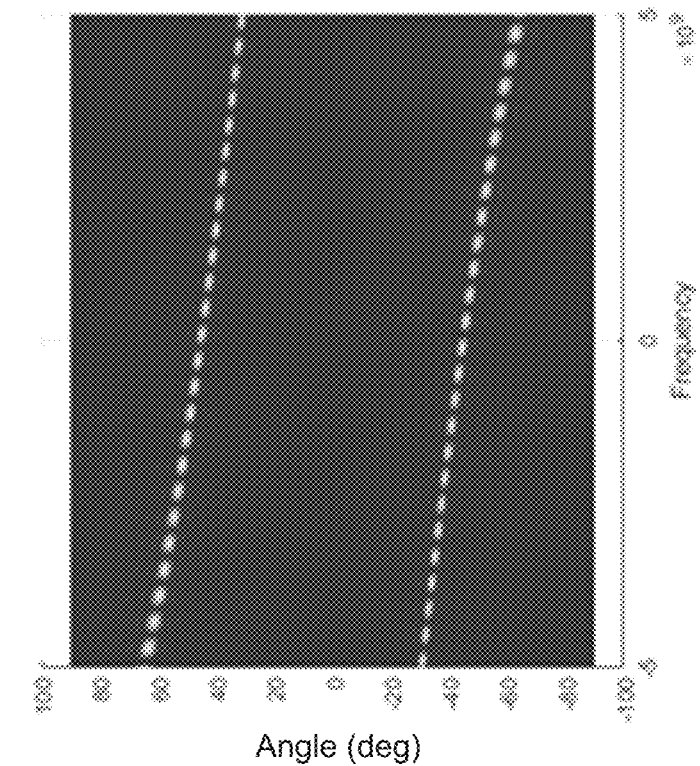
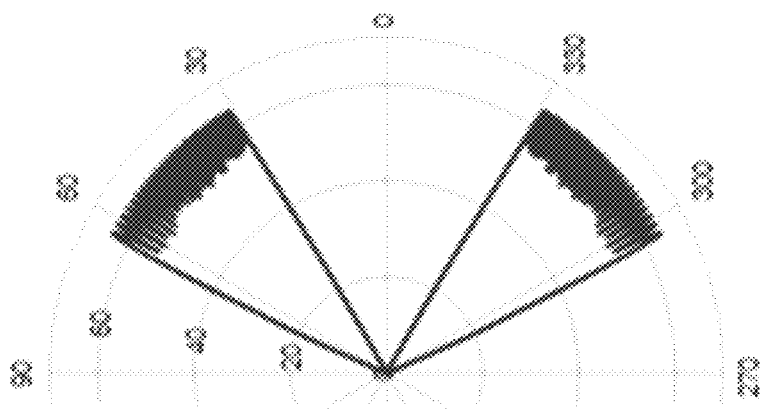
FIG. 34

Inputs: $M, W, \theta_1, \theta_2, \Delta\theta$

Calculate the array response vector: $\boldsymbol{a}_{tx}(\theta_1), \boldsymbol{a}_{tx}(\theta_2)$ For $m = 1:1:M$ $$\tau_{m,1} = (m-1)\frac{|\sin(\theta_1+\Delta\theta)-\sin(\theta_1)|+|\sin(\theta_2+\Delta\theta)-\sin(\theta_2)|}{2W}$$

$$\varphi_{m,1} = \mathrm{mod}(-\angle[\boldsymbol{a}_{tx}(\theta_1) + \boldsymbol{a}_{tx}(\theta_2)]_m + 2\pi\tau_{m,1}f_c,\ 2\pi)$$

// where $\angle[\boldsymbol{a}]_m$ represents the phase of the m-th component of a vector $\boldsymbol{a}$ and $f_c$ is the center frequency of the transmit signal (i.e., carrier frequency).

endFor

FIG. 35

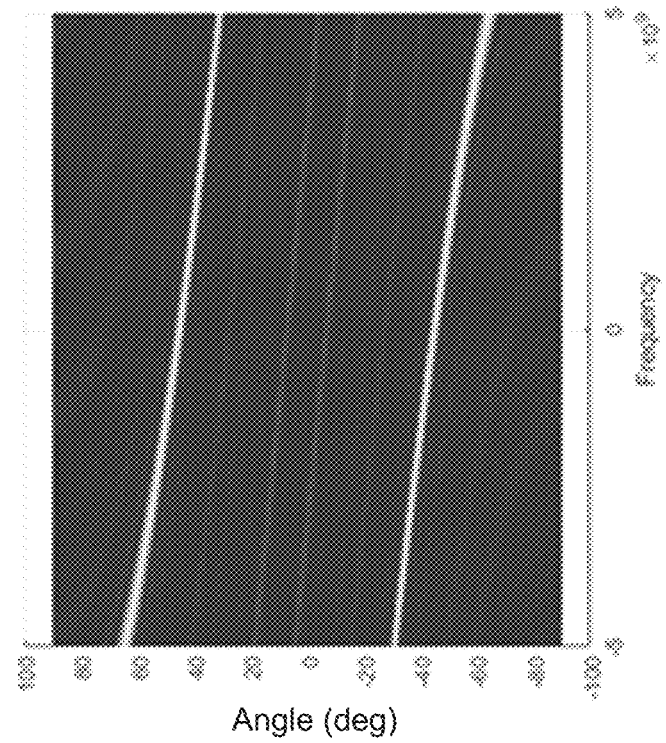
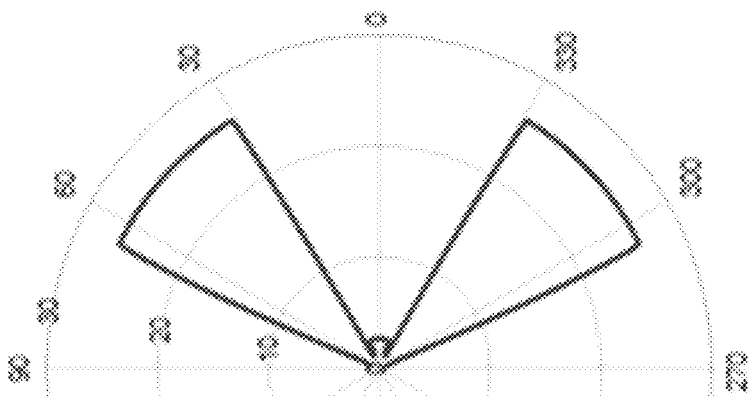
FIG. 36

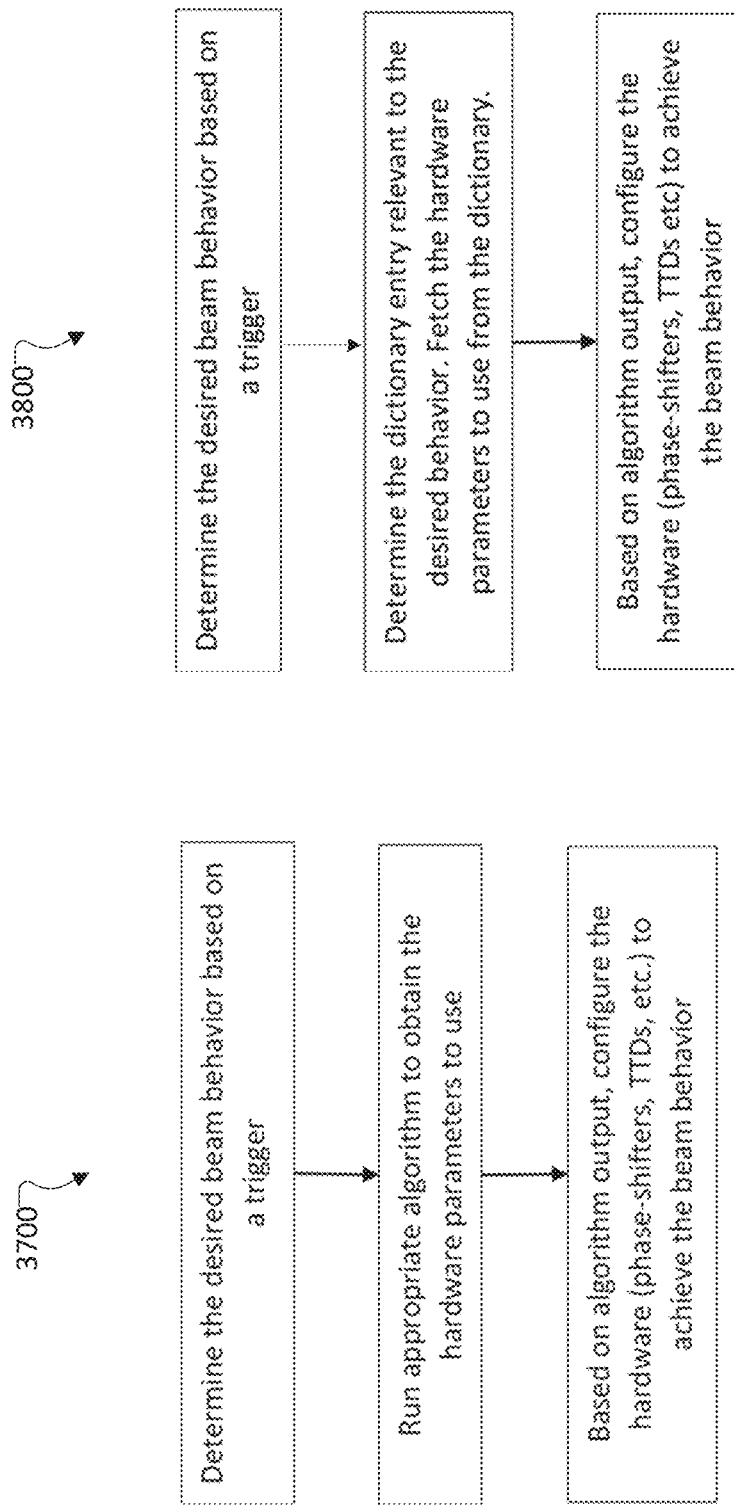

3900

---

Inputs: $b_k$ for $k \in \mathcal{K}$, and allowed TTD range $[0, \frac{K}{BW}]$ Calculate $\bar{b}_k = b_k / \|b_k\|$ for each $k \in \mathcal{K}$.

Initialize $\psi_k = 0$ for all $k \in \mathcal{K}$.

For $i = 1:1:\max - \text{iter}$

// Optimize $\tau, \phi$ for given $\psi$

For $i = 1:1:N$

Compute $\tau_n$ as solution to: $\tau_n = \underset{\tau_n}{\operatorname{argmax}} \left\{ \sum_{m \in \mathcal{M}_n} \left| \sum_{k \in \mathcal{K}} e^{-j\psi_k} [\bar{b}_k]_m^* e^{j2\pi f_k \tau_n} \right| \right\}$ // Here $\mathcal{M}_n$ is the set of phase-shifter indices connected to TTD $n$ Compute $\phi_m$ as: $\phi_m = \angle \left[ \sum_{k \in \mathcal{K}} e^{j\psi_k} [\bar{b}_k]_m e^{-j2\pi f_k \tau_n} \right]$ endFor // Push $\tau$ to the middle of allowed region $\tau_{min} = \min_n \{\tau_n\}$.

$\tau_{max} = \max_n \{\tau_n\}$.

$\bar{\tau} = \max\{\min\{\sum_n \frac{\tau_n}{N}, \frac{K}{2BW} + \tau_{min}\}, \tau_{max} - \frac{K}{2BW}\}$.

Set $\tau_n = \tau_n - \bar{\tau}$ for all $n = 1, .., N$

Set $\psi_k = \psi_k - 2\pi f_k \bar{\tau}$ for each $k \in \mathcal{K}$.

// Optimize $\psi$ for given $\tau, \phi$

For $k \in \mathcal{K}$

Compute $\psi_k$ as: $\psi_k = \angle \left[ \sum_{n=1}^{N} \sum_{m \in \mathcal{M}_n} [\bar{b}_k]_m^* e^{j\phi_m} e^{j2\pi f_k \tau_n} \right]$ endFor endFor

FIG. 39

SYSTEM AND METHOD FOR TIME-DELAY BASED HYBRID BEAMFORMING

CROSS-REFERENCE TO RELATED APPLICATIONS AND CLAIM OF PRIORITY

The present application claims priority to U.S. Provisional Patent Application Ser. No. 63/273,786 filed on Oct. 29, 2021 and U.S. Provisional Patent Application Ser. No. 63/337,496 filed on May 2, 2022. The contents of the above-identified patent documents are incorporated herein by reference.

TECHNICAL FIELD

The present disclosure relates generally to wireless communication systems and, more specifically, the present disclosure relates to a system and method for time-delay based hybrid beamforming.

BACKGROUND

Due to the rising demand for traffic, wireless systems are moving towards higher frequency of operation, such as millimeter-wave (mm-wave) and terahertz (THz) frequencies, where abundant spectrum is available. However, the higher frequencies also suffer from a high channel propagation loss, and therefore require a large antenna array to create sufficient beamforming gain to ensure sufficient link budget for operation. Thus, these high frequency systems are usually built with a large antenna array at the transmitter and/or the receiver containing many individual antenna elements. At the operating bandwidths of these mm-wave and THz systems, the cost and power consumption of mixed-signal components such as analog-to-digital converters (ADCs) and/or digital-to-analog converters (DACs) also grows tremendously. Thus, fully digital transceiver implementations, where each antenna element is fed by a dedicated radio-frequency (RF) chain, are impractical.

SUMMARY

The present disclosure relates to wireless communication systems and, more specifically, the present disclosure relates to a system and method for time-delay based hybrid beamforming.

In one embodiment, a method includes determining one or more delay values and one or more phase shift values for generation of multiple desired frequency-dependent analog beams. The method also includes configuring one or more true-time delay (TTD) elements and one or more phase shifters of a transceiver based on the one or more delay values and the one or more phase shift values, the transceiver having one or more radio-frequency (RF) chains connected to multiple antennas via the one or more TTD elements and the one or more phase shifters. The method also includes operating the transceiver to generate the multiple desired frequency-dependent analog beams.

In another embodiment, a device includes a transceiver that includes multiple antennas, one or more TTD elements, one or more phase shifters, and one or more RF chains connected to the multiple antennas via the one or more TTD elements and the one or more phase shifters. The device also includes a processor operably connected to the transceiver. The processor is configured to: determine one or more delay values and one or more phase shift values for generation of multiple desired frequency-dependent analog beams; configure the one or more TTD elements and the one or more phase shifters based on the one or more delay values and the one or more phase shift values; and control the transceiver to generate the multiple desired frequency-dependent analog beams.

In yet another embodiment, a non-transitory computer readable medium includes program code that, when executed by a processor of a device, causes the device to: determine one or more delay values and one or more phase shift values for generation of multiple desired frequency-dependent analog beams; configure one or more TTD elements and one or more phase shifters of a transceiver based on the one or more delay values and the one or more phase shift values, the transceiver having one or more RF chains connected to multiple antennas via the one or more TTD elements and the one or more phase shifters; and operate the transceiver to generate the multiple desired frequency-dependent analog beams.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7 through 10 illustrate several desirable frequency-dependent beam behaviors according to embodiments of the present disclosure;

FIG. 13 illustrates an example algorithm to achieve Beam Behavior 1 according to embodiments of the present disclosure;

FIG. 16 illustrates another example algorithm to achieve Beam Behavior 1 according to embodiments of the present disclosure;

FIG. 19 illustrates another example algorithm to achieve Beam Behavior 1 according to embodiments of the present disclosure;

FIG. 22 illustrates an example algorithm to achieve Beam Behavior 2 according to embodiments of the present disclosure;

FIG. 23 illustrates charts showing the beamforming gains that can be achieved in Beam Behavior 2;

FIG. 24 illustrates another example algorithm to achieve Beam Behavior 2 according to embodiments of the present disclosure;

FIG. 27 illustrates another example algorithm to achieve Beam Behavior 2 according to embodiments of the present disclosure;

FIG. 30 illustrates an example algorithm to achieve Beam Behavior 3 according to embodiments of the present disclosure;

FIG. 33 illustrates another example algorithm to achieve Beam Behavior 3 according to embodiments of the present disclosure;

FIG. 34 illustrates charts showing the beamforming gains that can be achieved in Beam Behavior 3;

FIG. 35 illustrates another example algorithm to achieve Beam Behavior 3 according to embodiments of the present disclosure;

FIG. 36 illustrates charts showing the beamforming gains that can be achieved in Beam Behavior 3;

FIG. 37 illustrates a flow diagram of an example process for configuring hardware to achieve the desired beam behaviors according to embodiments of the present disclosure;

FIG. 38 illustrates a flow diagram of an example process for configuring hardware to achieve desired beam behaviors using offline computation according to embodiments of the present disclosure;

FIG. 39 illustrates an example iterative optimization algorithm according to embodiments of the present disclosure.

DETAILED DESCRIPTION

Figure 1:
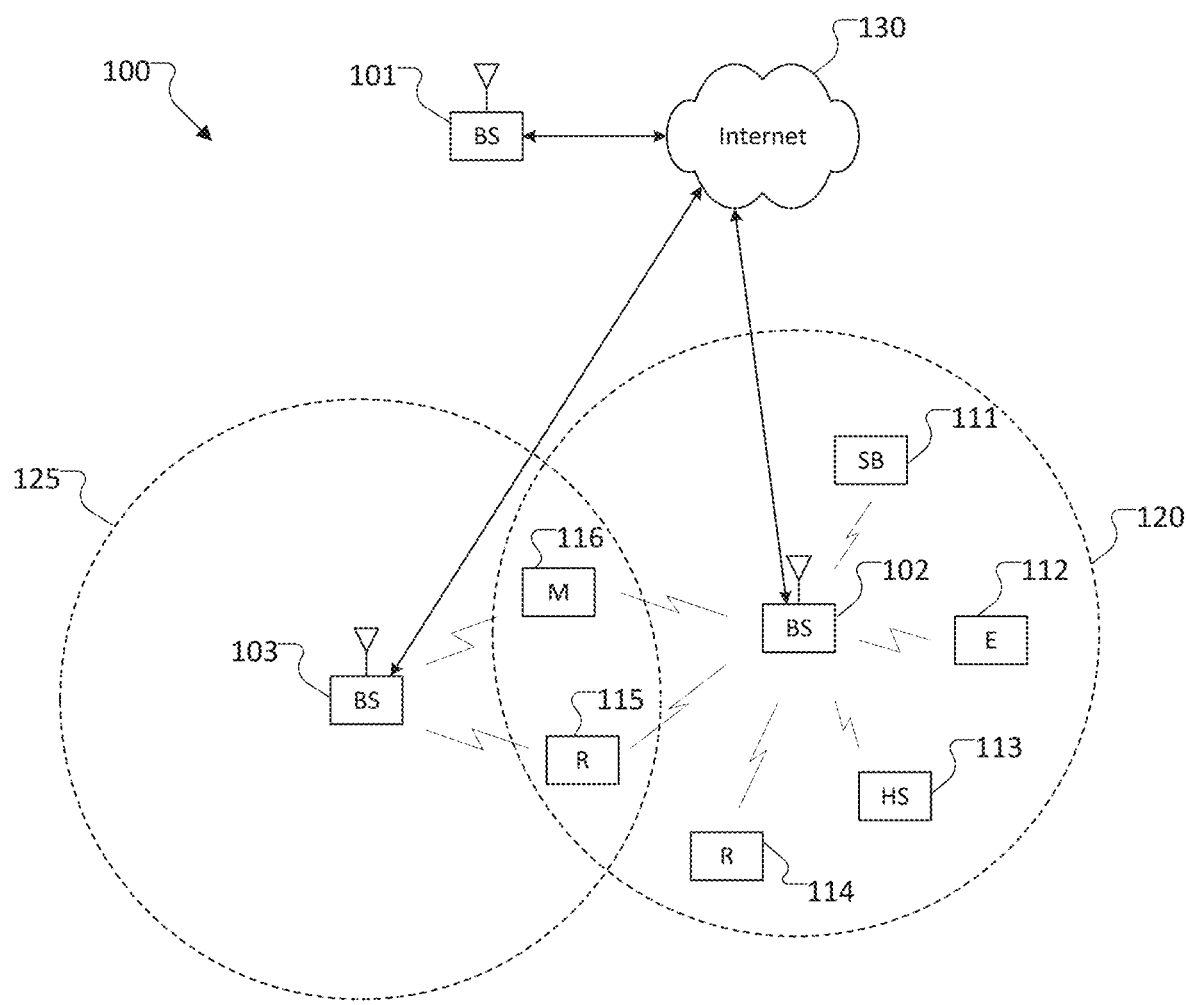
FIG. 1 illustrates an example wireless network according to embodiments of the present disclosure.

FIGS. 1 through 40, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another, or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-4B are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage (or broadcast) area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), LTE, LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for time-delay based hybrid beamforming. In certain embodiments, and one or more of the gNBs 101-103 includes circuitry, programming, or a combination thereof for time-delay based hybrid beamforming.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
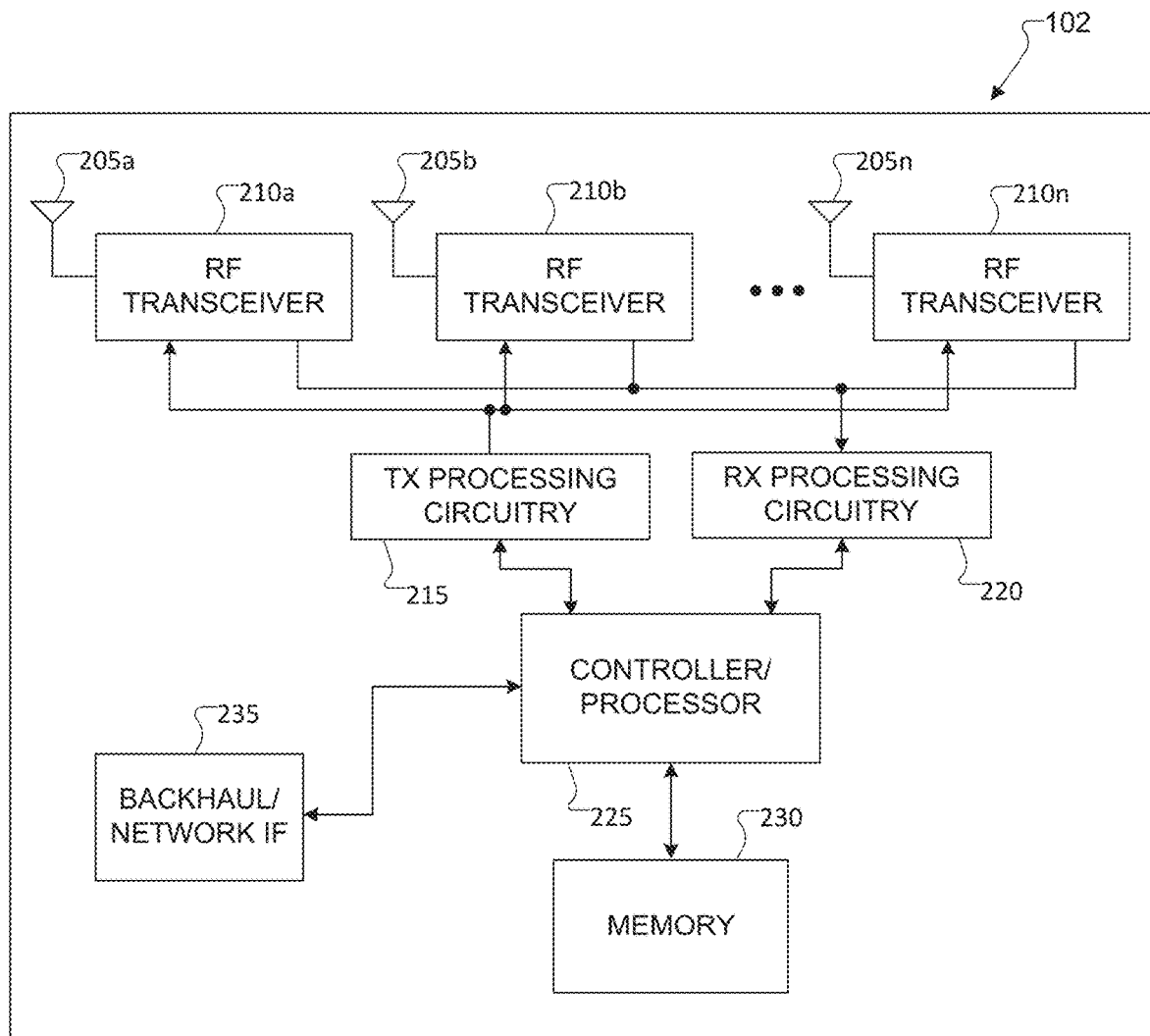
FIG. 2 illustrates an example gNB according to embodiments of the present disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support methods for time-delay based hybrid beamforming. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
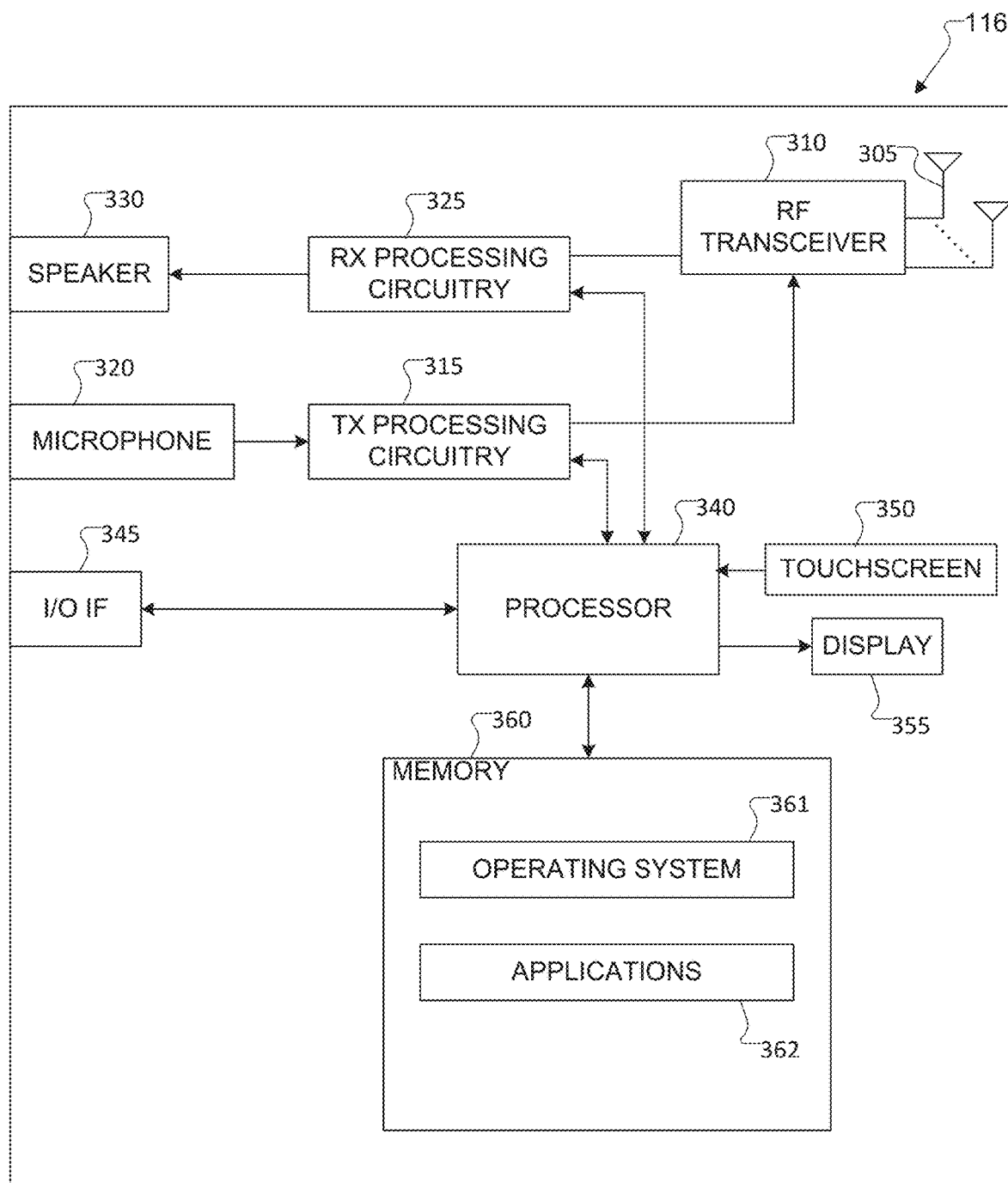
FIG. 3 illustrates an example UE according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for time-delay based hybrid beamforming. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
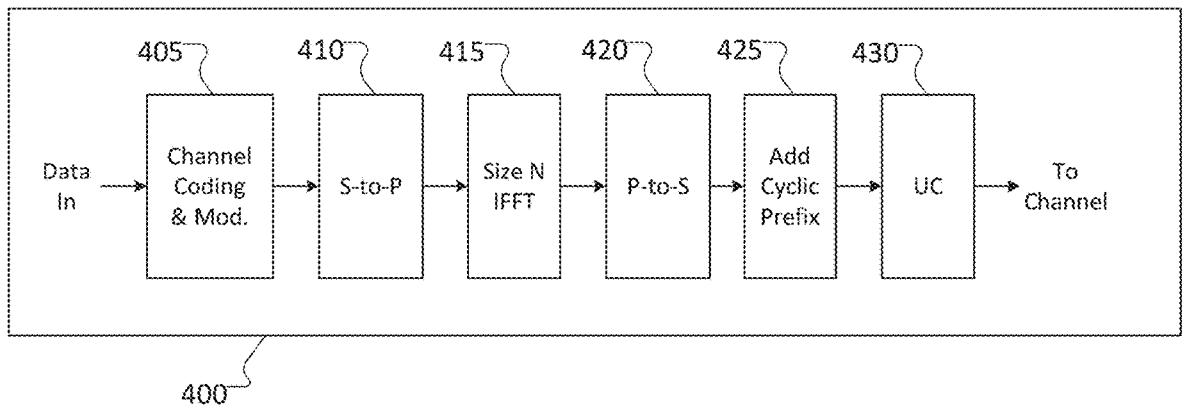
FIG. 4A illustrates a high-level diagram of an orthogonal frequency division multiple access transmit path according to embodiments of the present disclosure.
Figure 4B:
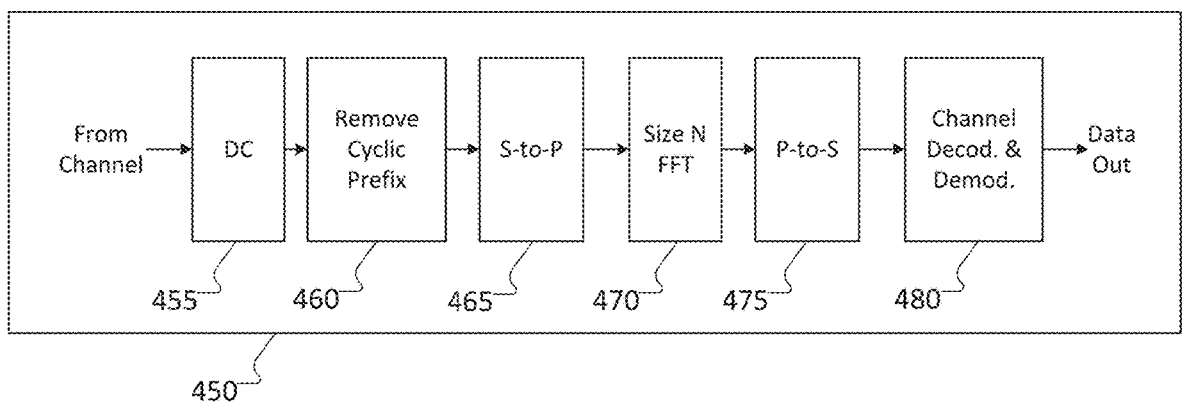
FIG. 4B illustrates a high-level diagram of an orthogonal frequency division multiple access receive path according to embodiments of the present disclosure.

FIG. 4A illustrates a high-level diagram of an orthogonal frequency division multiple access (OFDMA) transmit path 400 according to embodiments of the present disclosure. FIG. 4B illustrates a high-level diagram of an OFDMA receive path 450 according to embodiments of the present disclosure. In FIGS. 4A and 4B, for downlink communication, the transmit path 400 may be implemented in a base station (gNB) 102 or a relay station, and the receive path 450 may be implemented in a user equipment (e.g., user equipment 116 of FIG. 1). In other examples, for uplink communication, the receive path 450 may be implemented in a base station (e.g., gNB 102 of FIG. 1) or a relay station, and the transmit path 400 may be implemented in a user equipment (e.g., user equipment 116 of FIG. 1).

The transmit path 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. The receive path 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In the transmit path 400, the channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. The serial-to-parallel block 410 converts (i.e., de-multiplexes) the serial modulated symbols to parallel data to produce N parallel symbol streams where N is the IFFT/FFT size used in the gNB 102 and the UE 116. The Size N IFFT block 415 then performs an IFFT operation on the N parallel symbol streams to produce time-domain output signals. The parallel-to-serial block 420 converts (i.e., multiplexes) the parallel time-domain output symbols from the Size N IFFT block 415 to produce a serial time-domain signal. The add cyclic prefix block 425 then inserts a cyclic prefix to the time-domain signal. Finally, the up-converter 430 modulates (i.e., up-converts) the output of the add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. The down-converter 455 down-converts the received signal to baseband frequency, and the remove cyclic prefix block 460 removes the cyclic prefix to produce the serial time-domain baseband signal. The serial-to-parallel block 465 converts the time-domain baseband signal to parallel time-domain signals. The Size N FFT block 470 then performs an FFT algorithm to produce N parallel frequency-domain signals. The parallel-to-serial block 475 converts the parallel frequency-domain signals to a sequence of modulated data symbols. The channel decoding and demodulation block 480 demodulates and then decodes the modulated symbols to recover the original input data stream.

Each of gNB s 101-103 may implement a transmit path that is analogous to transmitting in the downlink to the UEs 111-116 and may implement a receive path that is analogous to receiving in the uplink from the UEs 111-116. Similarly, each one of the UEs 111-116 may implement a transmit path corresponding to the architecture for transmitting in the uplink to the gNBs 101-103 and may implement a receive path corresponding to the architecture for receiving in the downlink from the gNBs 101-103.

Figure 5:
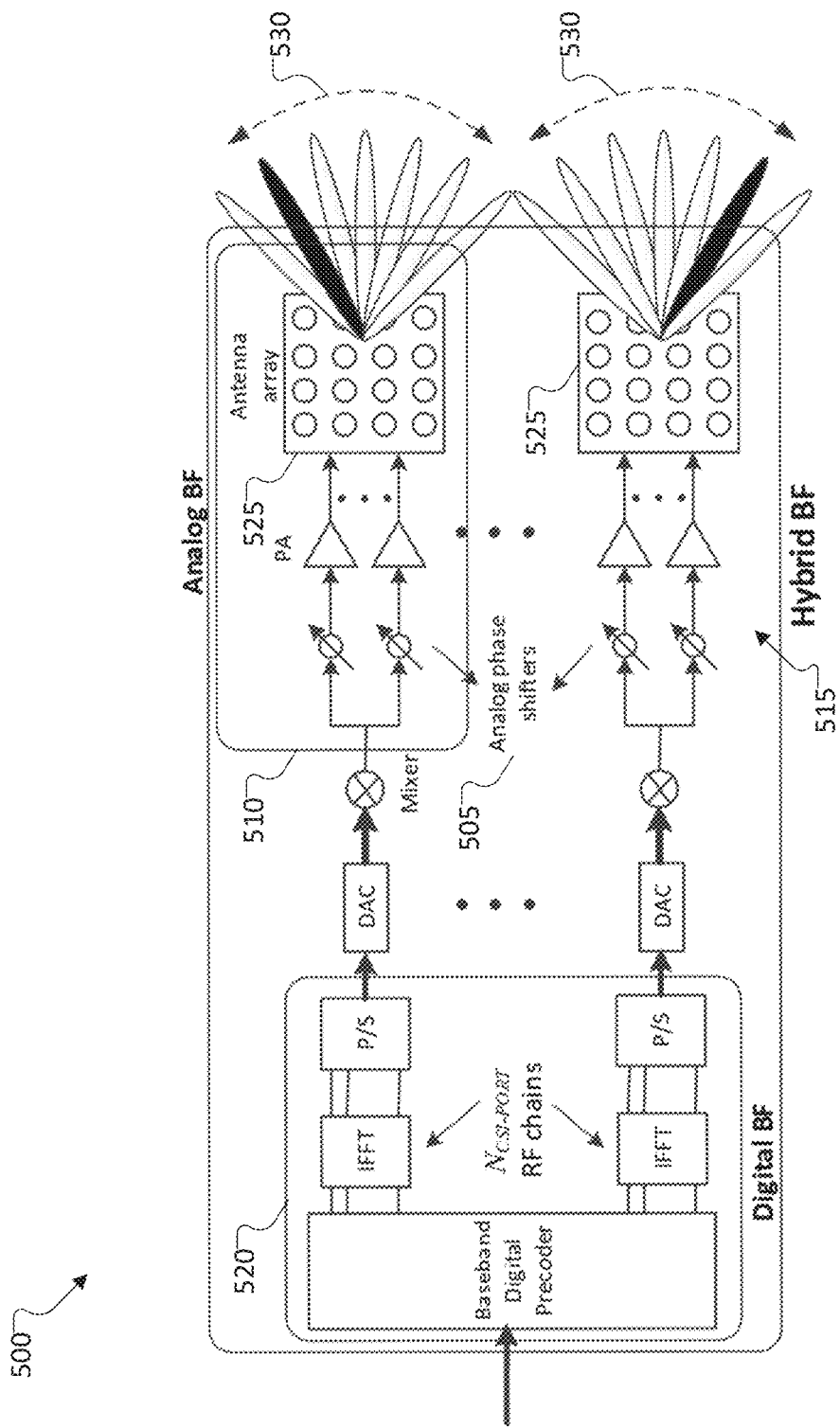
FIG. 5 illustrates an example beamforming architecture according to embodiments of the present disclosure.

FIG. 5 illustrates an example beamforming architecture 500 according to embodiments of the present disclosure. The embodiment of the beamforming architecture 500 illustrated in FIG. 5 is for illustration only. FIG. 5 does not limit the scope of this disclosure to any particular implementation of the beamforming architecture 500. In certain embodiments, one or more of gNB 102 or UE 116 can include the beamforming architecture 500. For example, one or more of antenna 205 and its associated systems or antenna 305 and its associated systems can be configured the same as or similar to the beamforming architecture 500.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converts/digital-to-analog converts (ADCs/DACs at mmWave frequencies)).

In the example shown in FIG. 5, the beamforming architecture 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports NCSI-PORT. A digital BF 515 performs a linear combination across NCSI-PORT analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the beamforming architecture 500 is also applicable to higher frequency bands such as >52.6 GHz (also termed the FR4). In this case, the beamforming architecture 500 can employ only analog beams. Due to the O2 absorption loss around 60 GHz frequency (~10 decibels (dB) additional loss @ 100 m distance), larger numbers of and sharper analog beams (hence larger number of radiators in the array) will be needed to compensate for the additional path loss.

As previously discussed, fully digital transceiver implementations, where each antenna element is fed by a dedicated radio-frequency (RF) chain, are impractical. To keep the hardware cost and power consumption of such large antenna arrays manageable, typically an analog beamforming or hybrid beamforming architecture is adopted where the large antenna array is fed with a much smaller number of RF chains via the use of analog hardware such as phase shifters. This reduces the number of mixed-signal components, which significantly reduces the cost, size and power consumption of the transceivers. When transmitting a signal at the transmitter, a combination of digital beamforming before DAC and analog beamforming using the phase shifters is used to create the overall beam shape in the desired direction. Similarly, when receiving a signal at the receiver, a combination of analog beamforming using phase shifters and digital beamforming after ADC is used to create the overall beam shape in the desired direction.

Conventional forms of analog beamforming or hybrid beamforming rely on the analog hardware components (e.g., phase shifters and switches) to create the beam shapes. However, these analog hardware components create a frequency-flat response, i.e., all components of the input signal frequency undergo a similar transformation after passing through them. This reduces the flexibility of the beamforming that is possible in such analog or hybrid beamforming systems, as compared to fully digital architectures where each antenna array is fed with a dedicated RF chain. This limitation of frequency-flat beamforming is further exacerbated at the mm-wave and THz frequencies, where beam-alignment, beam-tracking, link blockage and initial access are difficult problems to solve and usually involve significant overhead. There also exist several scenarios where the frequency flat-beamforming can limit the number of users that can be served simultaneously with the full beamforming gain.

Figure 6:
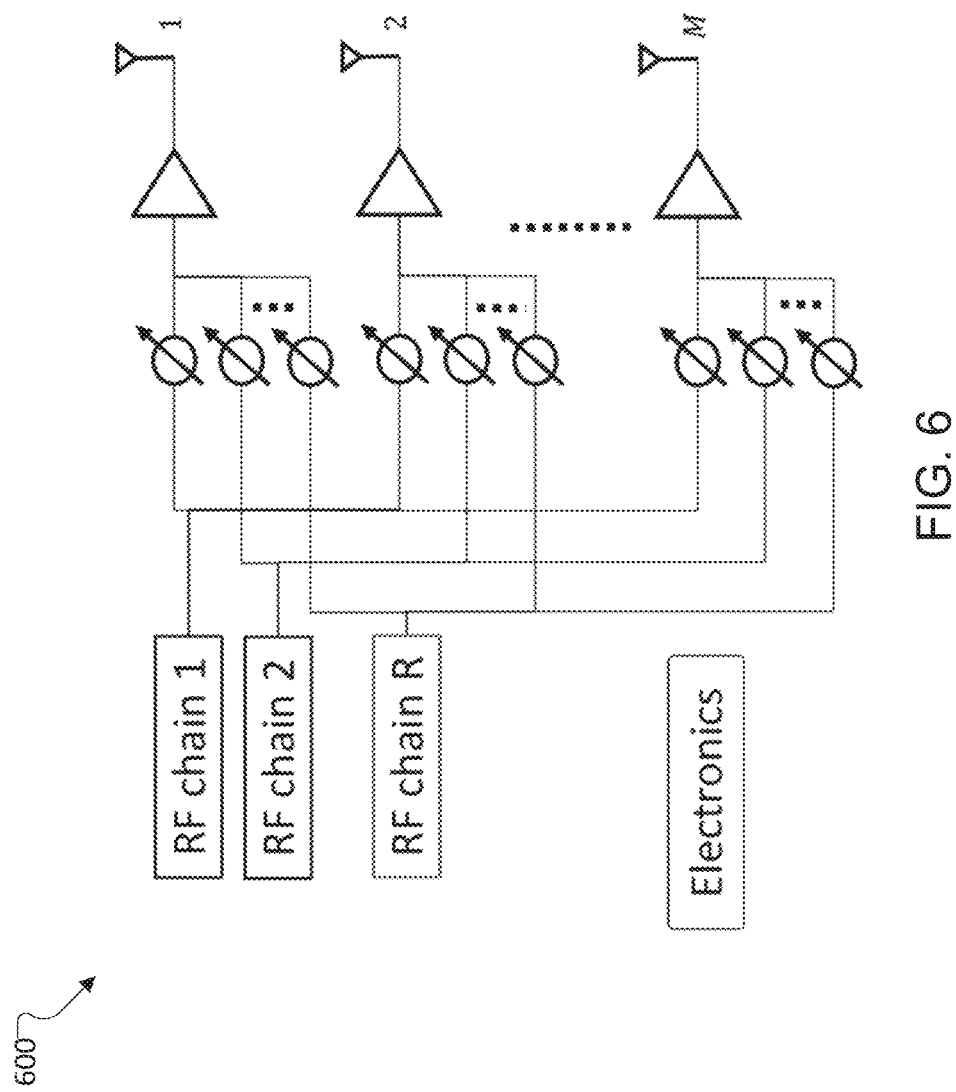
FIG. 6 illustrates a system that performs phase-shifter based hybrid beamforming with a single RF chain.

FIG. 6 illustrates a system 600 that performs phase shifter based hybrid beamforming with a single RF chain, i.e., R=1. Note that with M antennas, the maximum possible beamforming gain in any direction is M. In that case, with frequency-flat beamforming, two spatially separated users cannot be simultaneously (at the same time) served on half the bandwidth with the maximum beamforming gain of M. Similarly, in a scenario that includes many internet-of-things (IoT) users (each requiring a low bandwidth) that are spread uniformly in the angular space, they cannot all be served simultaneously (at the same time) with the full beamforming gain of M. Note that here, angular space refers to the angle subtended by the receiver's line-of-sight path at the transmitter. Furthermore, the beams that can achieve the full beamforming gain of M are often pencil thin and are highly prone to blockage, or misalignment caused by user mobility/rotation. The overhead for tracking these beam directions (in case of misalignment) and also to perform the initial alignment can be very high in large antenna systems with very few RF chains. This limits the performance gains achievable using frequency-flat hybrid beamforming.

To address these and other issues, this disclosure provides a system and method for time-delay based hybrid beamforming. As described in more detail below, the disclosed embodiments utilize a type of analog hardware called true-time delay (TTD). Unlike switches and phase shifters, TTDs have a frequency-dependent behavior, i.e., different components of the input signal frequency undergo different transformations after passing through the TTD. Thus, the disclosed embodiments feature hybrid transceiver architectures where a small number of RF chains are connected to a large antenna array using TTDs. Using such architectures, the disclosed embodiments can achieve frequency-dependent beamforming that is more versatile than conventional, frequency-flat beamforming methods. Note that, here, frequency-dependent beamforming refers to a technique where different components of the input signal may encounter a differently shaped analog beam based on their frequency. The disclosed embodiments feature any of several transceiver architectures that use a combination of phase shifters, switches, and TTDs as analog components that connect the large antenna array to a small number of RF chains. The disclosed embodiments also feature several key frequency-dependent beamforming behaviors that can be realized, and also feature multiple algorithms for realizing the frequency-dependent beamforming behaviors.

Note that while some of the embodiments discussed below are described in the context of hybrid beamforming systems, these are merely examples. It will be understood that the principles of this disclosure may be implemented in any number of other suitable contexts or systems.

FIGS. 7 through 10 illustrate several desirable frequency-dependent beam behaviors that can be useful in different scenarios.

Beam Behavior 1: As shown in FIG. 7, in frequency-dependent beam forming scenarios that exhibit this behavior, the maximum gain region of the beam sweeps over an angle range as the signal frequency varies. This behavior can be useful at a BS in scenarios where many users are uniformly distributed in an angular region and require simultaneous service in downlink and uplink (PDSCH and PUSCH). For such uniformly spread users, the physical uplink control channel (PUCCH) overhead can also be reduced with this beam behavior, since it enables all users to send small uplink control packets (e.g. HARQ-ACK packets) simultaneously. This behavior is also desirable in scenarios where the users are moving at a high velocity, and good link reliability and fast beam re-alignment are needed. In addition, such a beam behavior is also beneficial in scenarios where the BS wishes to obtain initial beam alignment with one or more users at a very low overhead. Finally, this behavior is also useful for increasing the uplink cell coverage range, by allowing each user device on cell edge to accumulate more power by transmitting longer.

Figure 8:
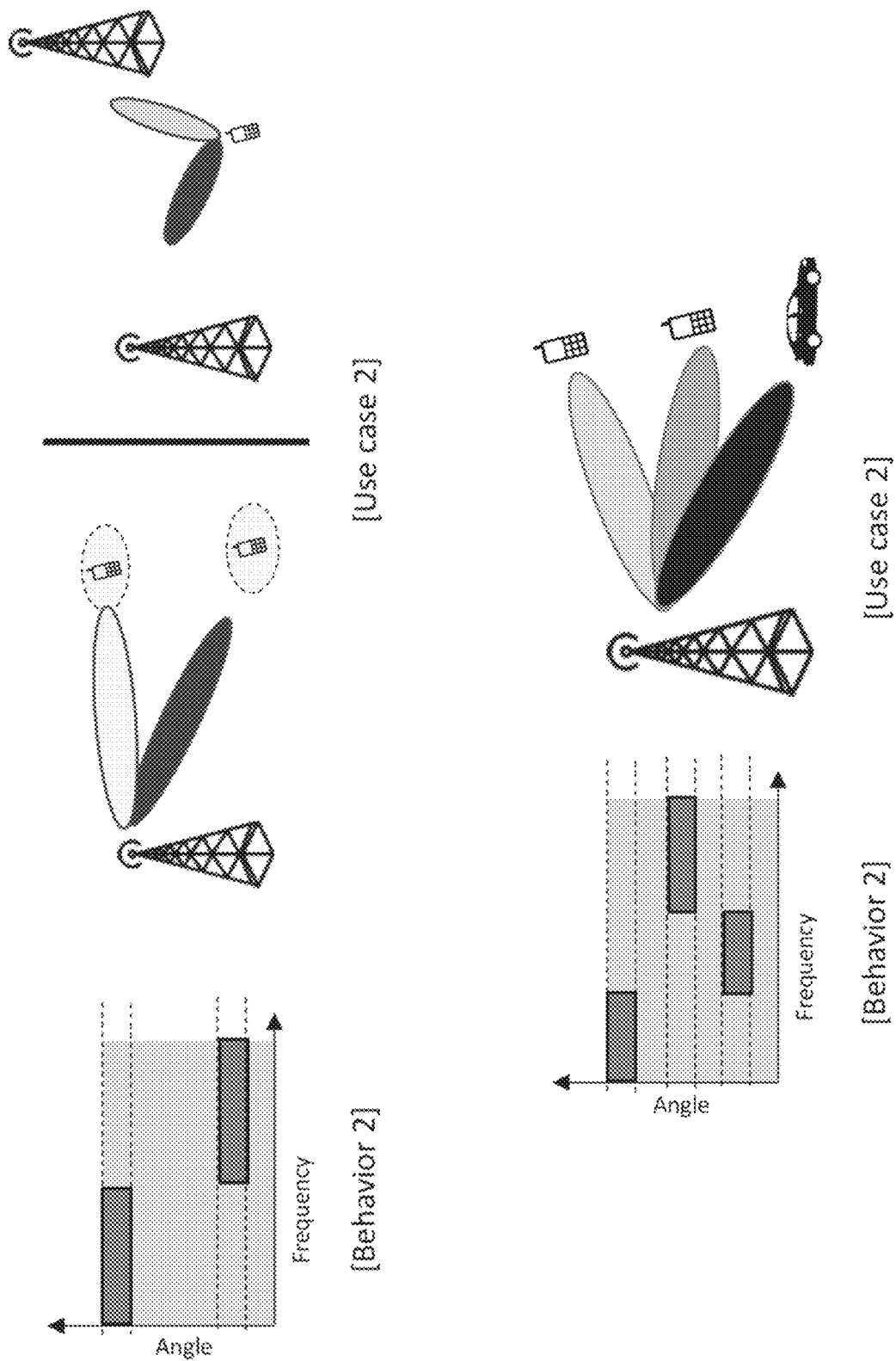

Beam Behavior 2: As shown in FIG. 8, in frequency-dependent beam forming scenarios that exhibit this behavior, the maximum gain region points in one angular direction over the lower half of the signal bandwidth and it points in another angular direction over the upper half bandwidth. This behavior is useful in scenarios where the users are sparsely distributed in the angular domain, and the BS wishes to provide service to multiple users simultaneously on different portions of the large available system bandwidth. Such service on portions of the bandwidth is helpful, for example, if each user is incapable of utilizing the full system bandwidth or if each user only has very low traffic to send. Extensions of such behavior that cover more than two angular directions can also be considered, such as shown in the bottom of FIG. 8.

Beam Behavior 3: As shown in the examples of FIG. 9, the maximum gain region spans region 1 of the angular space at one subset of frequencies (subset 1) and region 2 of the angular space at a disjoint set of frequencies (subset 2). Within each of subset 1 and subset 2 frequencies, the maximum gain region sweeps across angular space region 1 and angular space region 2, respectively. This behavior is useful when the users are clustered in several different localized regions and require simultaneous service or require fast beam realignment.

Beam Behavior 4: As shown in FIG. 10, in this behavior, a wide beam is constructed that provides coverage for a certain angular region for most of the bandwidth. However, for a sub-band of the bandwidth, the width of the wide beam may be adapted to reduce co-channel interference to some incumbent users using that sub-band.

Similar behaviors of the frequency-dependent beam can also be useful at a user device in several scenarios, e.g. for initial beam alignment and tracking. Note that this kind of frequency-dependent beamforming is not possible using conventional hybrid beamforming techniques that use only phase shifters or switches. In the present disclosure, several different embodiments of transceiver architectures are described that utilize a combination of phase shifters, TTDs, and switches that can realize the aforementioned beam behaviors. In addition, multiple design algorithms are provided for choosing the values of the phase-shifts and the TTDs that can achieve these beam-behaviors.

Figure 11:
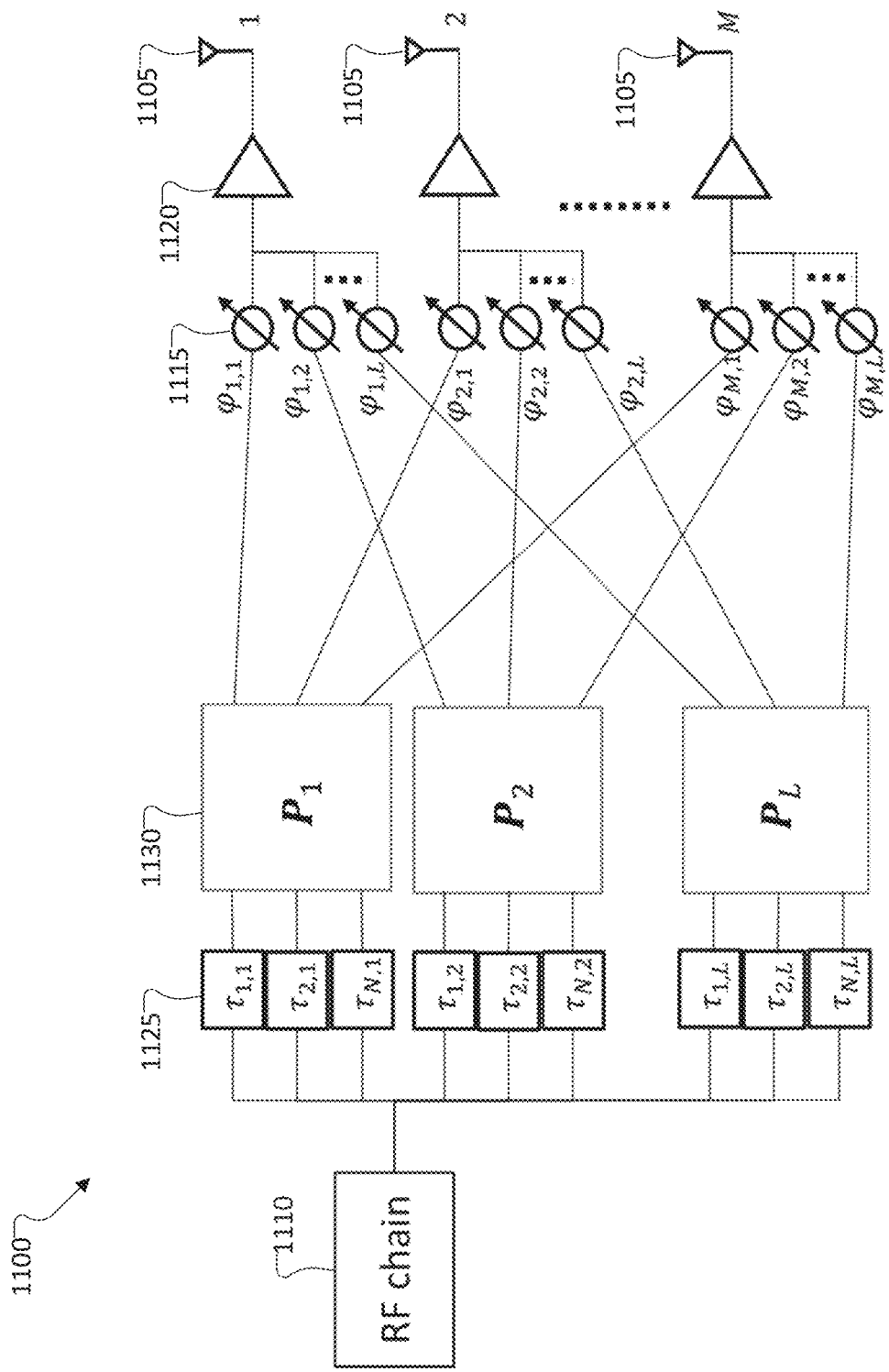
FIG. 11 illustrates an example transceiver for performing TTD-based hybrid beamforming according to embodiments of the present disclosure.

FIG. 11 illustrates an example transceiver 1100 for performing TTD-based hybrid beamforming according to embodiments of the present disclosure. As shown in FIG. 11, the transceiver 1100 is a BS transceiver that is equipped with M antennas 1105 and one RF chain 1110. Each antenna 1105 (represented as m) is connected to L different phase shifters 1115 via one or more power amplifiers 1120. In the figure, the corresponding frequency-independent phase-shifts are identified as $\{\varphi_{m,1}, \varphi_{m,1}, \ldots, \varphi_{m,L}\}$. For each $l \in \{1, \ldots, L\}$ the phase shifts $\{\varphi_{1,l}, \varphi_{2,l}, \ldots, \varphi_{M,l}\}$ are connected to N dedicated TTDs 1125 having delay values $\{\tau_{1,l}, \tau_{2,l}, \ldots, \tau_{N,l}\}$, where $N \leq M$, via a mapping matrix 1130 (represented as $P_l$). The mapping matrix 1130 $P_l$ essentially determines how the N TTDs 1125 connect to the corresponding M phase shifters 1115. In some embodiments, each mapping matrix 1130 may be simply a set of fixed connections. In some embodiments, the mapping can be performed using one or more RF switches, which create re-configurable mappings.

The inputs to the TTDs 1125 are all directly fed by the output of the RF chain 1110 of the transceiver 1100. Thus in total, the transceiver 1100 has ML phase shifters 1115, L mapping matrices 1130 and NL TTD elements 1125 (where $N \leq L$). Here the TTD elements 1125 can be implemented using electronic components or using photonic components. Moreover, the TTD elements 1125 can have either fixed or reconfigurable delay values. Additionally, some of the TTD elements 1125 can also be implemented in the digital domain by including more RF chains.

It is noted that the architecture of the transceiver 1100 shown in FIG. 11 is only one example and should not be interpreted as a limitation of the present disclosure. For example, the same architecture can also be extended to a multiple-RF chain scenario by incorporating several such arrays in parallel, each having their own separate RF chain. It is noted that for this architecture at the transmitter, assuming orthogonal frequency division multiplexing (OFDM), the transmit signal on subcarrier $k \in \mathcal{K}$ can be expressed as:

$$x_k = \sum_{l=1}^{L} \frac{1}{\sqrt{M}} \begin{bmatrix} e^{j\varphi_{1,l}} \\ e^{j\varphi_{2,l}} \\ \vdots \\ e^{j\varphi_{M,l}} \end{bmatrix} \odot P_l \begin{bmatrix} e^{-j2\pi f_k \tau_{1,l}} \\ e^{-j2\pi f_k \tau_{2,l}} \\ \vdots \\ e^{-j2\pi f_k \tau_{N,l}} \end{bmatrix} s_k = \sum_{l=1}^{L} (T_l \odot (P_l D_{k,l})) s_k \quad (1)$$

where ⊙ is the Hadamard product (i.e., the element-wise matrix product), $T_l$ is the l-th phase-shifter vector, and $D_{k,l}$ is the TTD vector at subcarrier $k \in \mathcal{K}$, respectively.

The desired frequency-dependent beam-behaviors described above (i.e., Behavior 1, Behavior 2, Behavior 3, and Behavior 4) can all be interpreted as wanting the maximum beamforming (of M) in some desired angular regions $\Theta = \cup_{i=1}^{I} [\theta_i - \Delta\theta_i, \theta_i + \Delta\theta_i]$ as the transceiver 1100 sweeps across the frequencies within the system bandwidth. For example, in Behavior 1, I=1, $\theta_1$ is the center angle of the angular region over which the BS intends to sweep the beam, and $2\Delta\theta_1$ is the overall angle of sweep. Similarly in Behavior 2, I=2, $\theta_1$ and $\theta_2$ are the angles corresponding to user 1 and user 2, respectively, and $\Delta\theta_1 = \Delta\theta_2 = 0$ (i.e., no beam sweeping). Since in many scenarios, it does not matter which frequency region is assigned to each of the angular regions of interest, in some embodiments, the phase shifter and TTD design problem can be formulated as:

$$\underset{T,\{\tau_1,\ldots,\tau_N\}}{\operatorname{argmax}} \left\{ \sum_{\theta \in \Theta} \sum_{k \in \mathcal{K}} \frac{\left|\sum_l a_{tx}(\theta)^{\dagger}(T_l \odot (P_l D_{k,l}))\right|^{2\beta}}{\left\|\sum_l (T_l \odot (P_l D_{k,l}))\right\|^{2\beta}} \right\} \quad (2)$$

where $\beta$ can be a system design parameter, † represents the transpose operation, and $\alpha_{tx}(\theta)$ is the array response vector of the antenna array in direction $\theta$. For example, for a uniform linear antenna array with half-wave inter-element spacing, the array response vector $\alpha_{tx}(\theta)$ can be expressed as:

$$a_{tx}(\theta) = \begin{bmatrix} 1 \\ e^{-j\pi \sin(\theta)} \\ \vdots \\ e^{-j\pi M \sin(\theta)} \end{bmatrix} \quad (3)$$

It is noted the problem formulation in Equation (2) is not limited to uniform linear arrays, and one can use the proper $\alpha_{tx}(\theta)$ that matches the array structure. Other array structures may include planner uniform arrays and non-uniform arrays.

Next, some embodiments for realizing the desired beam behaviors will be described.

Beam Behavior 1:

Beam Behavior 1 can be useful in scenarios where simultaneous service is required for several users in a localized region with the full beamforming gain, or in scenarios where link reliability and easy beam-tracking are desired, or where fast initial beam-alignment is desired. In this scenario, it is assumed without loss of generality that the desired coverage region is $\Theta = [\theta_1 - \Delta\theta_1, \theta_1 + \Delta\theta_1]$.

Figure 12:
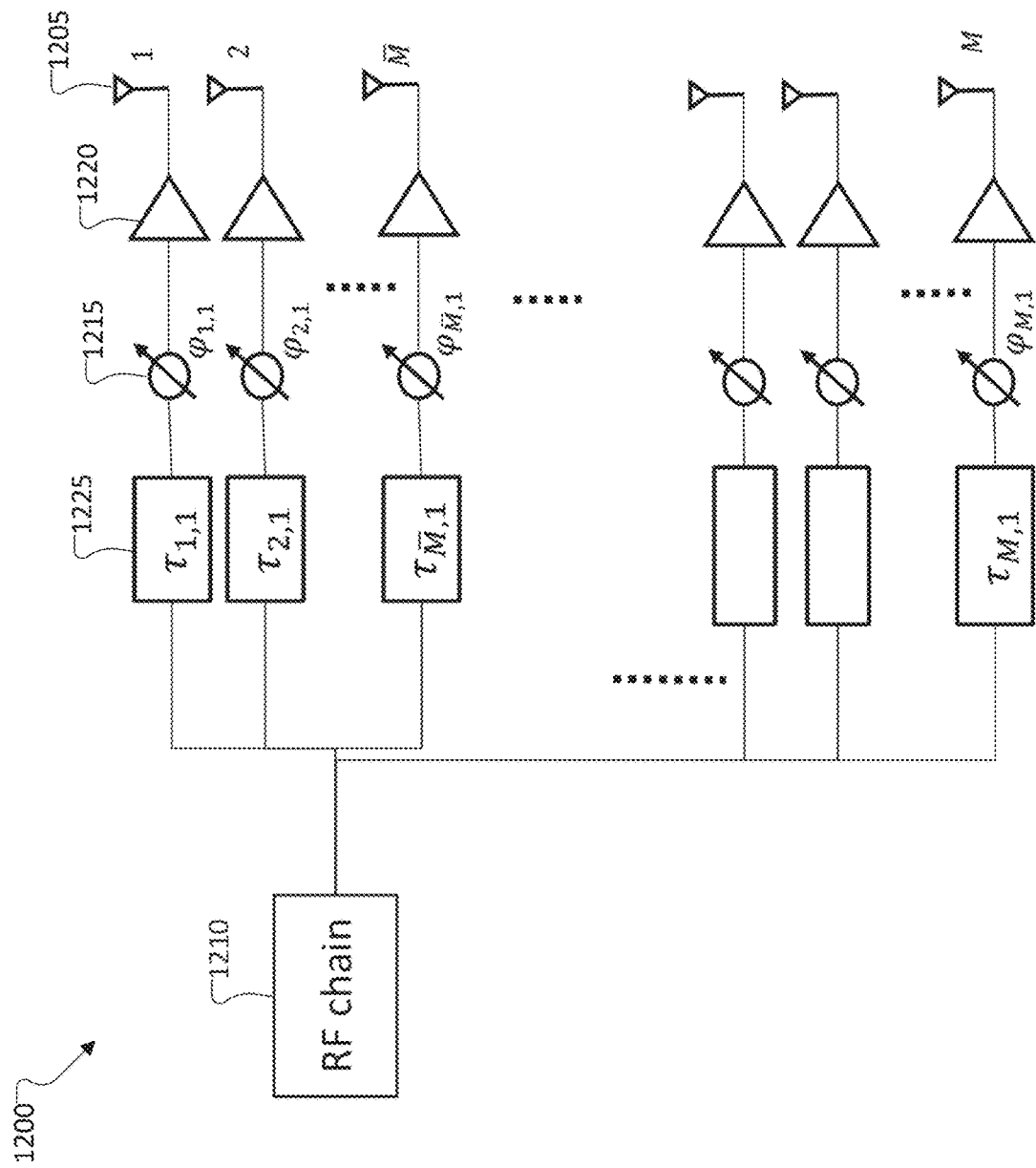
FIG. 12 illustrates an example transceiver for performing TTD-based hybrid beamforming for Beam Behavior 1 according to embodiments of the present disclosure.

FIG. 12 illustrates an example transceiver 1200 for performing TTD-based hybrid beamforming for Beam Behavior 1 according to embodiments of the present disclosure. As shown in FIG. 12, the transceiver 1200 includes multiple antennas 1205, a RF chain 1210, multiple phase shifters 1215, multiple amplifiers 1220, and multiple TTDs 1225. The transceiver 1200 is a special case of the transceiver 1100 shown in FIG. 11, with L=1, N=M, $P_l = \mathbb{1}_M$. Thus in the transceiver 1200, the number of phase shifters 1215 and the number of TTDs 1225 are both set to M, and each mapping matrix is just a straight wire connection. In some embodiments, the TTDs 1225 are reconfigurable, and the TTD 1225 corresponding to antenna m is configured to have a delay variation between $\tau_{m,1} \in [0, (m-1) \sin(\Delta\theta_{max})/\pi W]$, where W is the system bandwidth and $\Delta\theta_{max}$ is the maximum desired beam-sway in one direction of the center angle. In some embodiments, to achieve the desired behavior over $\Theta$, the TTD delays and phase shifts can be set based on the example algorithm 1300 shown in FIG. 13.

Figure 14:
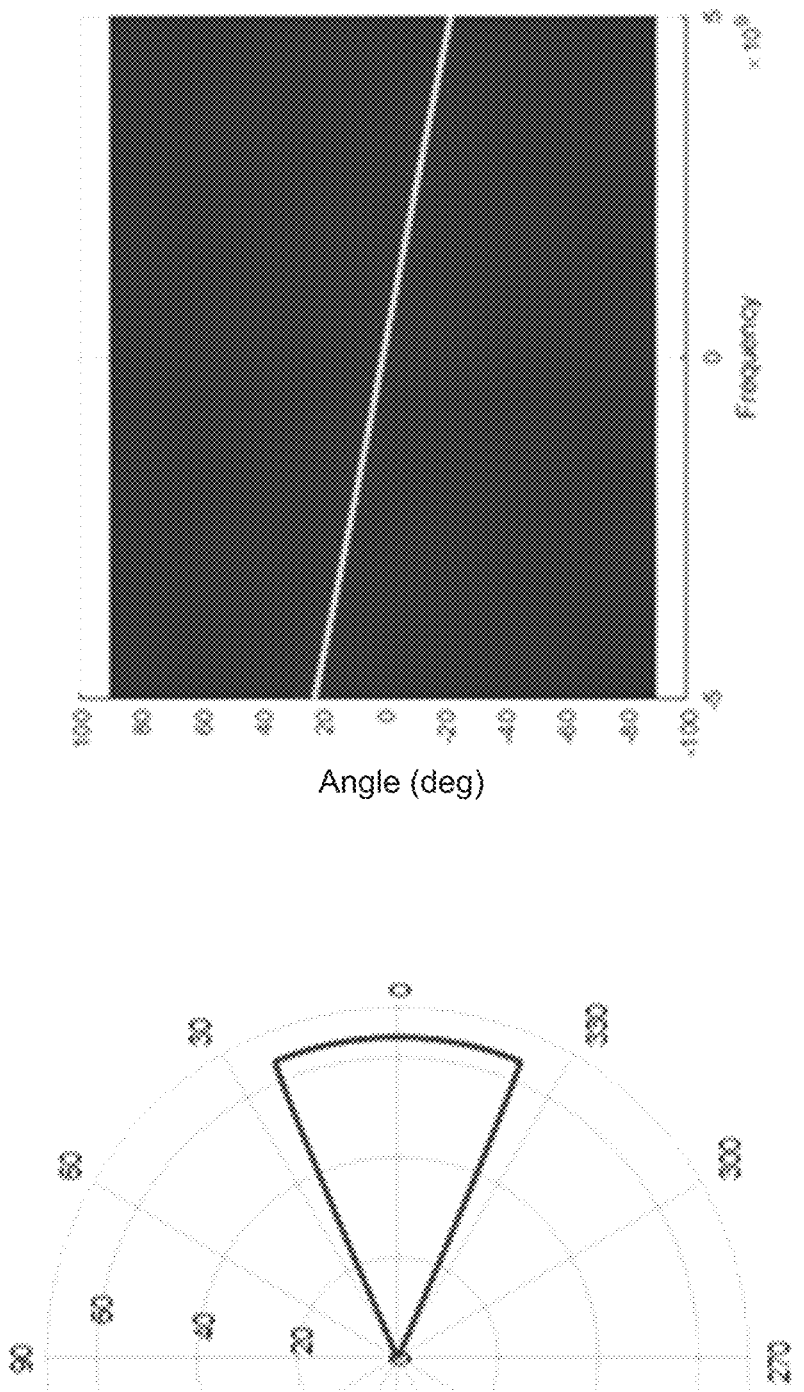
FIG. 14 illustrates charts showing the beamforming gains that can be achieved in Beam Behavior 1.

As an example, the achievable antenna gain for a TX with a half-wavelength spaced uniform linear array with M=N=64, $\theta_1=0$ and $\Delta\theta_1=\pi/8$ is illustrated in FIG. 14. As can be seen from FIG. 14, this design can achieve the desired Beam Behavior 1.

In the architecture represented by the transceiver 1200, for each angle in the vicinity of $\theta_1$, there is a unique frequency region where the peak beamforming gain is obtained. Thus in fast user mobility scenarios, by observing the frequency or sub-carrier where the highest signal power is obtained, the receiver can estimate the best beam direction or the required beam correction to be used at the transmitter. Thus fast beam-alignment can be achieved using this architecture. Furthermore, as the user moves away by more than a 3 dB beam-width on one frequency, the SNR doesn't completely fall to zero on the whole band. Rather the maximum beamforming gain shifts to a different frequency. This can beneficial since it can provide a graceful degradation of service with user mobility and does not cause sudden outage as in the case of frequency-flat beamforming.

In some scenarios, it might be costly to implement finely tunable TTDs. And so, in a related embodiment, the transceiver 1200 may support only discrete beam-sway values $2\Delta\theta_1$. In this case, selectable fixed delay TTDs can be used. For example, to support three beam-sway options $$\Delta\theta_1 = 0, \frac{\pi}{16}, \text{ or } \frac{\pi}{8},$$

the algorithm 1300 can be used to compute three sets of TTDs 1225, then switches can be implemented to select one on the three fixed TTD options per antenna 1205. The transceiver 1200 may be designed such that the maximum beam-sway value $2\Delta\theta_{max}$ is less than or equal to the beam-width of the individual antenna elements in the array.

Figure 15:
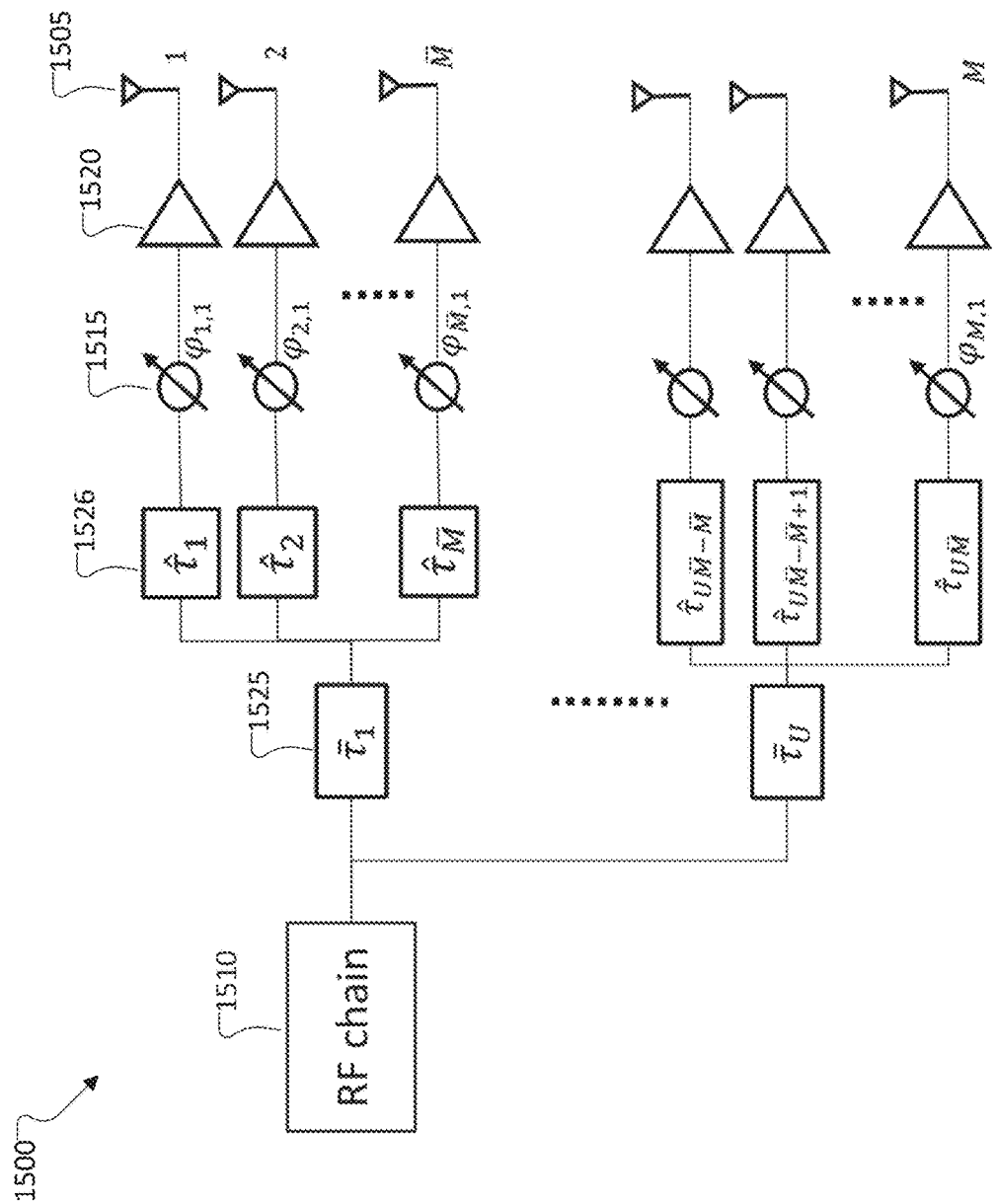
FIG. 15 illustrates another example transceiver for performing TTD-based hybrid beamforming for Behavior 1 according to embodiments of the present disclosure.

In the aforementioned embodiment, the required delay values for larger antenna indices m≈M can be quite large: [0, (m−1) sin $(\Delta\theta_{max})/\pi W$]. Correspondingly, in another embodiment (referred to as Embodiment 2 for clarity), the antenna array can be divided into [M/$\overline{M}$] sub-arrays, each containing $\overline{M}$ adjacent antenna elements. For example, FIG. 15 illustrates another example transceiver 1500 for performing TTD-based hybrid beamforming for Behavior 1 (Embodiment 2) according to embodiments of the present disclosure. As shown in FIG. 15, the transceiver 1500 includes multiple antennas 1505, a RF chain 1510, multiple phase shifters 1515, multiple amplifiers 1520, and multiple TTDs 1525-1526. Each sub-array has a dedicated TTD 1525 for providing a large delay value, while each antenna within the sub-array may also have a TTD 1526 providing small intra-sub-array delays that require a much smaller max delay range.

The transceiver 1500 is a special case of the transceiver 1100 shown in FIG. 11, with L=1, N=M, $P_l = \mathbb{1}_M$, and $\tau_{n,1} = \hat{\tau}_{[n/\overline{M}]} + \bar{\tau}_n$. In the transceiver 1500, the number of phase shifters 1515 is M and number of TTDs 1525-1526 is M+[M/$\overline{M}$], where $\overline{M}$ is a design parameter and each mapping matrix is just a straight wire connection. However for the TTDs 1525-1526, the required tunable delay range is: $\hat{\tau}_m \in [0, (\text{mod}(m-1, \overline{M})) \sin (\Delta\theta_{max})/W]$ and $\bar{\tau}_u \in [0, (u-1)$ $\overline{M}\sin(\Delta\theta_{max})/W$]. Thus in other words, out of the total TTDs, M TTDs 1526 only require a small max-delay while the $[M/\overline{M}]$ TTDs 1525 require a larger delay value. Since the number of TTDs 1525 with large delay is reduced, the hardware cost can be lower than Embodiment 1 described with respect to FIG. 12. In some embodiments, to achieve the desired behavior over $\Theta$, the TTD delays and phase-shifts can be set based on the example algorithm 1600 shown in FIG. 16.

Figure 17:
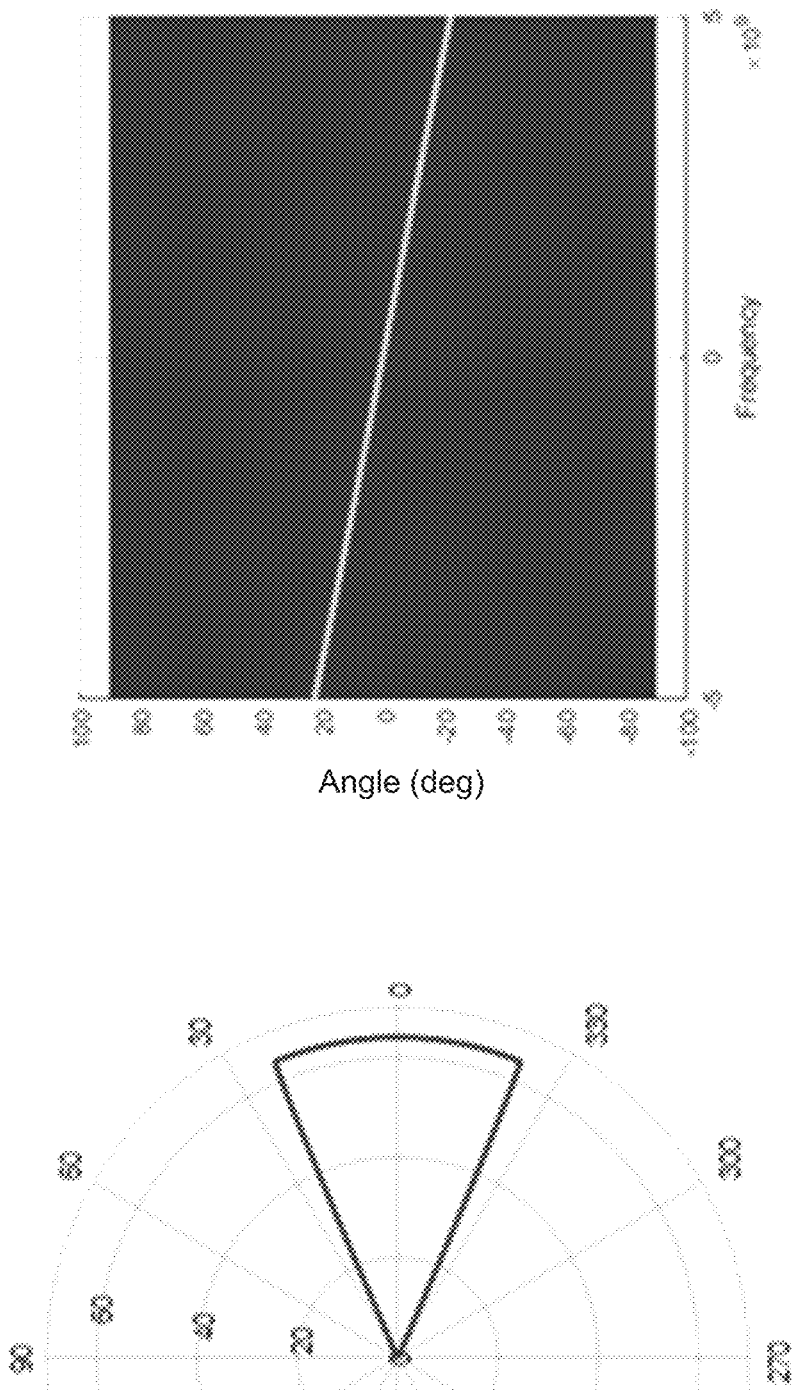
FIG. 17 illustrates charts showing the beamforming gains that can be achieved in Beam Behavior 1.

As an example, the achievable antenna gain for a TX with a half-wavelength spaced uniform linear array with M=N=64, $\theta_1=0$ and $\Delta\theta_1=\pi/8$ is illustrated in FIG. 17. As can be seen from FIG. 17, this design can achieve the desired Beam Behavior 1. By comparing FIG. 14 and FIG. 17, it can be seen that this architecture can achieve identical performance as Embodiment 1 described with respect to FIG. 12.

In some embodiments, in the transceiver 1500, instead of one RF chain 1510, U RF chains can be used to allow for a digital implementation of the TTDs $\bar{\tau}_u$ while keeping the analog implementation of $\hat{\tau}_m$.

Figure 18:
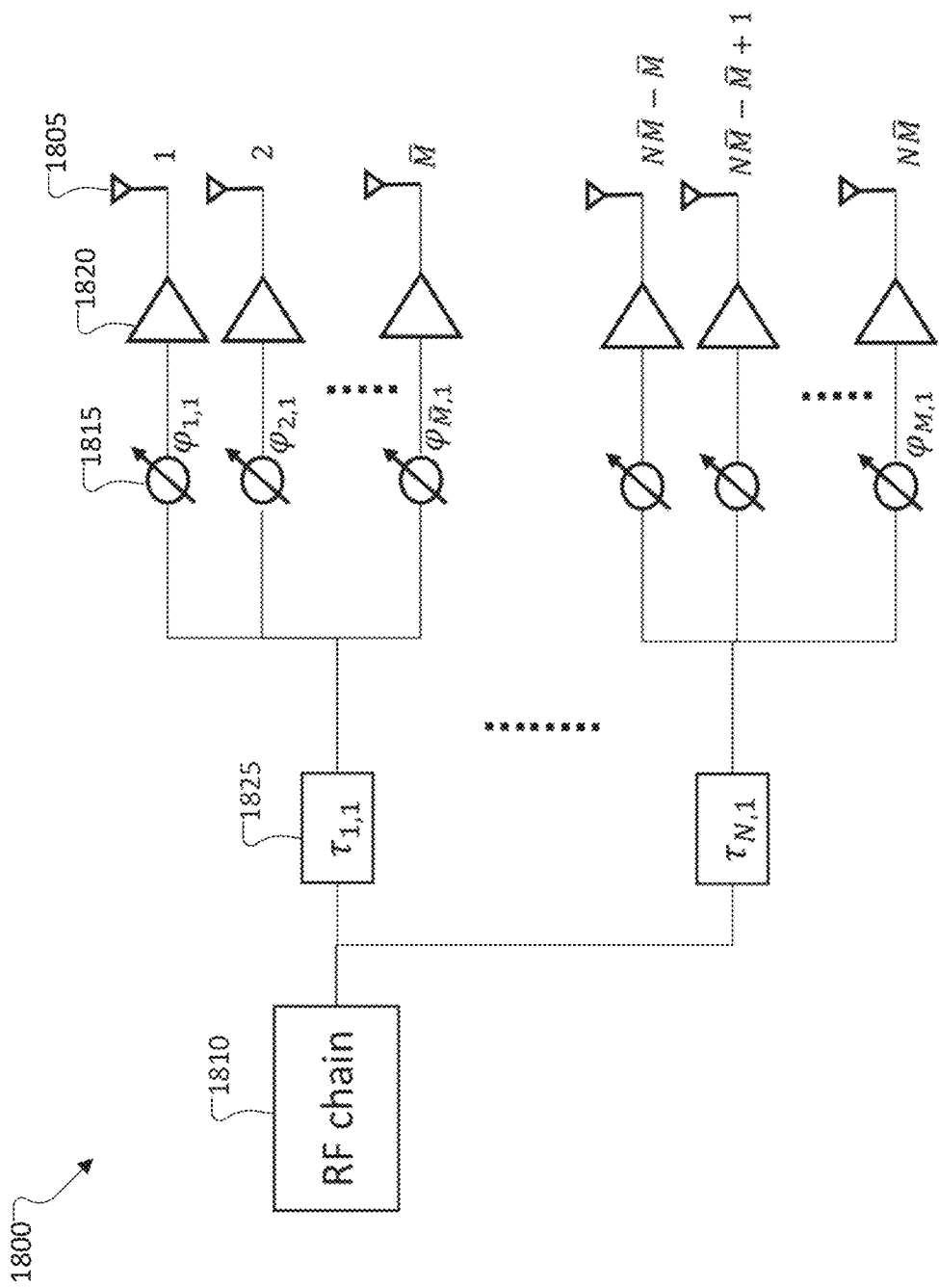
FIG. 18 illustrates yet another example transceiver for performing TTD-based hybrid beamforming for Behavior 1 according to embodiments of the present disclosure.

In both the aforementioned two embodiments, the number of TTDs 1525-1526 is equal to or larger than the number of antenna elements 1505, M, which could be difficult to fabricate in some scenarios. Therefore, in another embodiment (referred to as Embodiment 3 for clarity), the antenna array can be divided into $[M/\overline{M}]$ sub-arrays, each containing $\overline{M}$ adjacent antenna elements. For example, FIG. 18 illustrates another example transceiver 1800 for performing TTD-based hybrid beamforming for Behavior 1 (Embodiment 3) according to embodiments of the present disclosure. As shown in FIG. 18, the transceiver 1800 includes multiple antennas 1805, a RF chain 1810, multiple phase shifters 1815, multiple amplifiers 1820, and multiple TTDs 1825. Unlike Embodiment 2 (FIG. 15), the transceiver 1800 does not include any intra-sub-array TTD elements.

The transceiver 1800 is a special case of the transceiver 1100 shown in FIG. 11, with L=1, N=$[M/\overline{M}]$, $P_1=\mathbb{I}_N \otimes \mathbb{1}_{\overline{M}\times 1}$. In the transceiver 1800, the number of phase shifters 1815 is M and number of TTDs 1825 is only $[M/\overline{M}]$, where $\overline{M}$ is a design parameter and each mapping matrix is just a splitter that connects each delay output to all the $\overline{M}$ phase shifters in the corresponding sub-array. The desired tunable delay range is: $\tau_{n,1} \in [0, n\overline{M}\sin(\Delta\theta_{max})/W]$. In some embodiments, to achieve the desired behavior over $\Theta$, the TTD delays and phase shifts can be set based on the example algorithm 1900 shown in FIG. 19.

Figure 20:
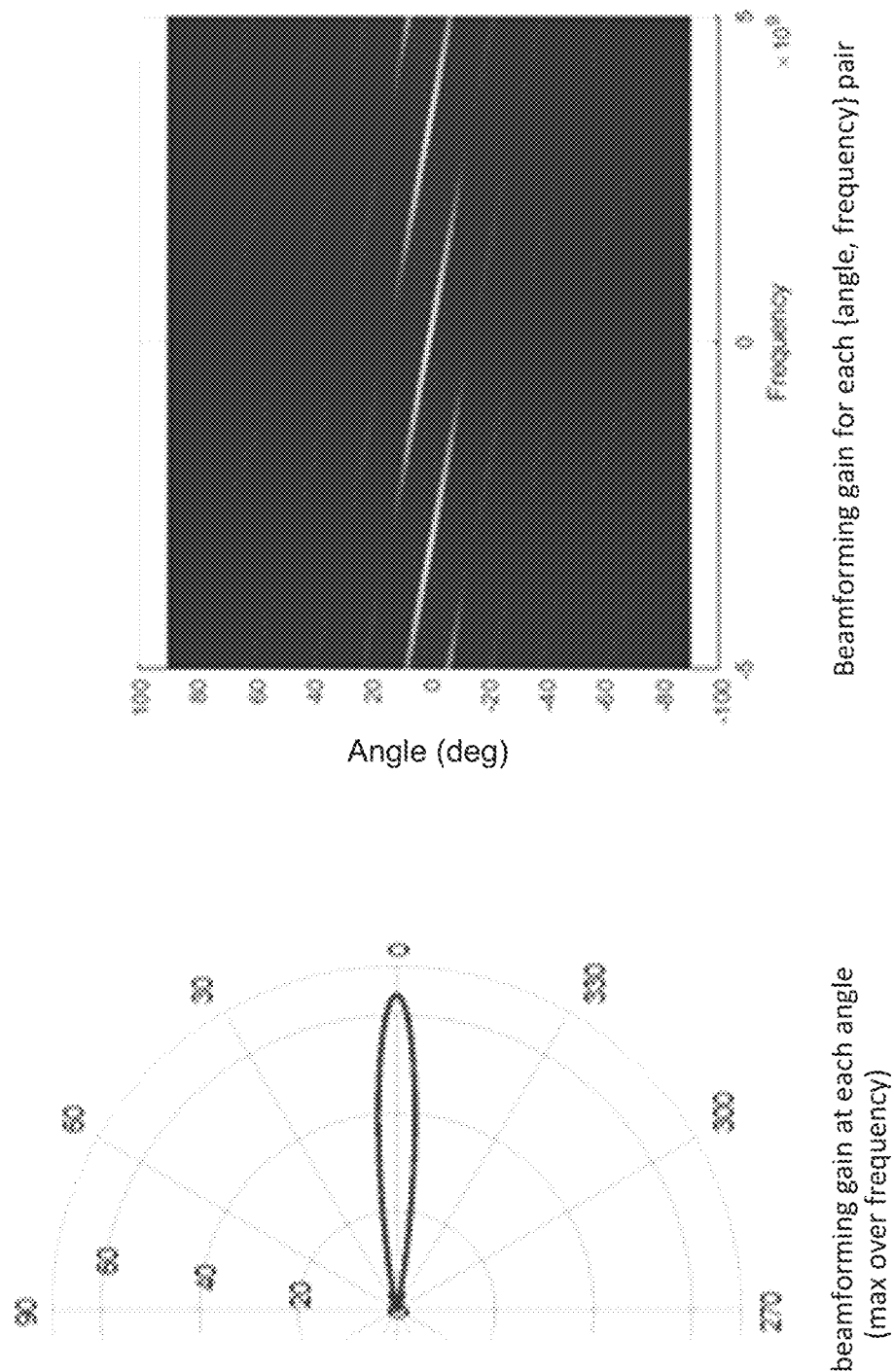
FIG. 20 illustrates charts showing the beamforming gains that can be achieved in Beam Behavior 1.

As an example, the achievable antenna gain for a TX with a half-wavelength spaced uniform linear array with M=N=64, $\overline{M}=8$, $\theta_1=0$ and $\Delta\theta_1=\pi/8$ is illustrated in FIG. 20. As can be seen from FIG. 20, this design can approximately achieve the desired Beam Behavior 1. Due to the limited number of TTDs 1825, the beamforming gain is less then M as the beam sweeps away from the center angle. Thus the transceiver 1800 can be a good choice when the desired sweep angle $\Delta\theta_1$ is small, which can limit the loss due to reduction in the beamforming gain. For larger values of $\Delta\theta_1$, the loss in beamforming gain can be significant with this low-complexity architecture. To avoid such loss, $\overline{M}$ can be chosen such that $\overline{M} \leq \pi/2\Delta\theta_1$. In some embodiments, in the transceiver 1800, instead of one RF chain, N RF chains can be used to allow for a digital implementation of the TTDs $\tau_u$.

Beam Behavior 2:

Beam Behavior 2 can be useful in scenarios where simultaneous service is required for users that are spatially far apart with the full beamforming gain. In this scenario, it is assumed without loss of generality that the desired coverage region is $\Theta=\{\theta_1,\theta_2\}$. In Beam Behavior 2, it is possible to create good beamforming gain in two discontinuous angular regions, albeit on different portions of the bandwidth.

Figure 21:
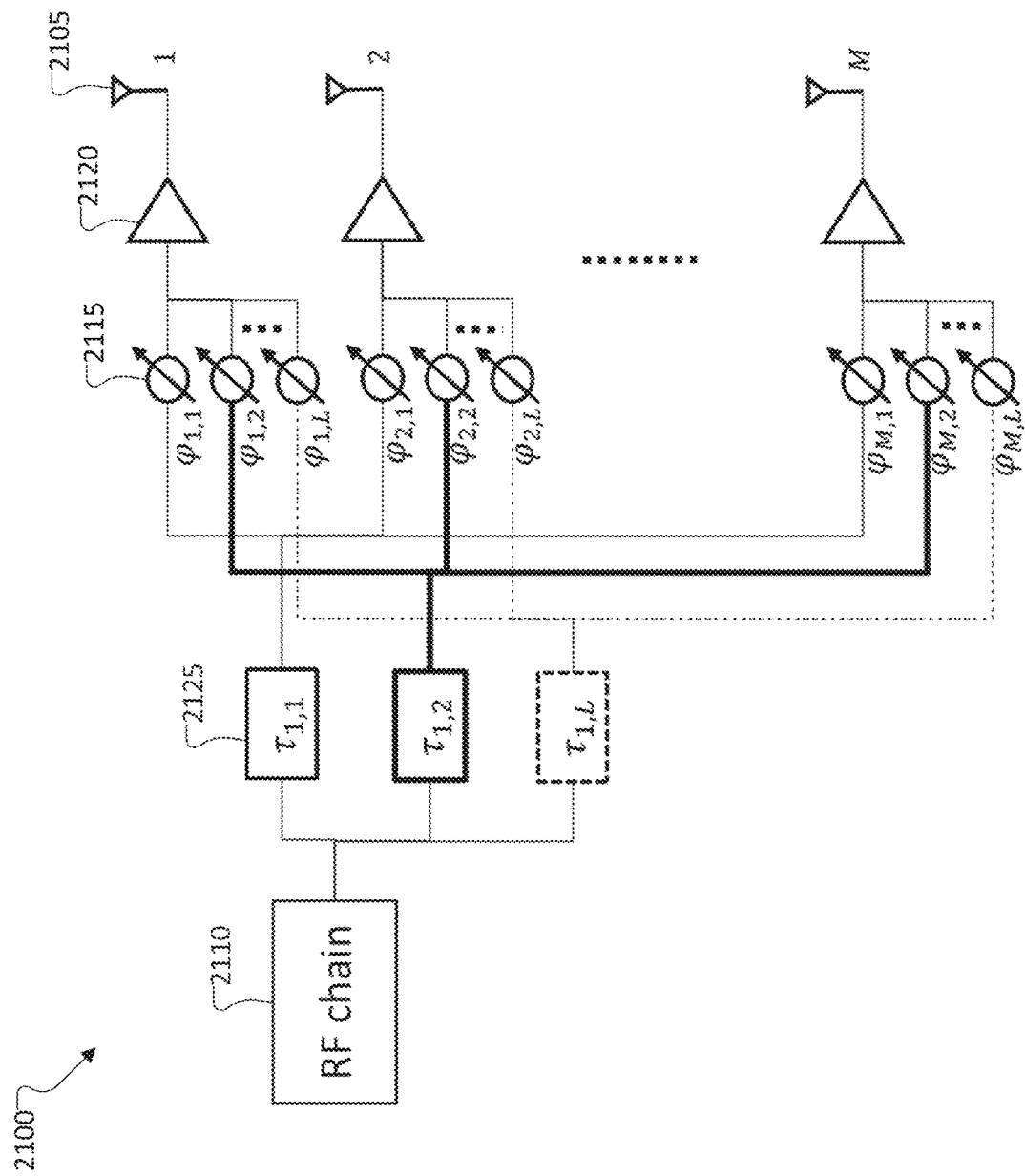
FIG. 21 illustrates an example transceiver for performing TTD-based hybrid beamforming for Beam Behavior 2 according to embodiments of the present disclosure.

FIG. 21 illustrates an example transceiver 2100 for performing TTD-based hybrid beamforming for Beam Behavior 2 according to embodiments of the present disclosure. As shown in FIG. 21, the transceiver 2100 includes multiple antennas 2105, a RF chain 2110, multiple phase shifters 2115, multiple amplifiers 2120, and multiple TTDs 2125.

The transceiver 2100 is a special case of the transceiver 1100 shown in FIG. 11, with N=1, $P_l = \mathbb{1}_{M\times 1}$. For clarity and ease of discussion, this embodiment is referred to as Embodiment 4. Each antenna 2105 is connected to L different phase shifters 2115 with the frequency-independent phase-shifts being $\{\varphi_{m,1}, \varphi_{m,1}, \ldots, \varphi_{m,L}\}$. The l-th phase shifters 2115 from all the antennas 2105 are connected together and fed by a common TTD 2125 with delay $\tau_{1,l}$. Thus in the transceiver 2100, the number of phase shifters 2115 is ML and number of TTDs 2125 is L, and each mapping matrix is a splitter that connects the l-th TTD 2125 to each of the l-th phase shifters 2115 corresponding to the M antennas 2105. In some embodiments, the TTDs 2125 are reconfigurable, and the TTD l is designed to have a delay variation between $\tau_{1,l} \in [0, (l-1)/W]$, where W is the system bandwidth. In one embodiment where L=2, to achieve the desired behavior over $\Theta$, the TTD delays and phase shifts can be set based on the example algorithm 2200 shown in FIG. 22.

As an example, the achievable antenna gain for a TX with a half-wavelength spaced uniform linear array with M=64, L=2, $\theta_1=\pi/4$ and $\theta_2=-\pi/4$ is illustrated in FIG. 23. As can be seen from FIG. 23, the transceiver 2100 can achieve the desired Beam Behavior 2, where a nearly-full beamforming gain (of 52) is achievable in the two directions on two halves of the system bandwidth. In a related embodiment, in the transceiver 2100, instead of one RF chain 2110, L RF chains 2110 can be used to allow for a digital implementation of the TTDs $\tau_{1,l}$.

In the transceiver 2100 (Embodiment 4), although the number of required TTDs 2125 is very few, the architecture may require many phase shifters 2115 (ML) and the corresponding routing of the phase shifters 2115 to the TTDs 2125 can be complex. Therefore, the TTD-based architecture of the transceiver 1200 (Embodiment 1) can be used in conjunction with another algorithm to achieve the desired Beam Behavior 2. Note that this is a special case of the transceiver 1100 shown in FIG. 11, with L=1, N=M, $P_l = \mathbb{I}_M$. The number of phase shifters 1215 and number of TTDs 1225 are both set to M, and each mapping matrix is just a straight wire connection. In one embodiment, the TTDs 1225 are reconfigurable and the TTD 1225 corresponding to antenna m is designed to have a delay variation between $\tau_{m,1} \in [0, 3/(4W)]$, where W is the system bandwidth. This delay range can be much smaller than what is required to achieve Beam Behavior 1 using Embodiment 1. In some embodiments, to achieve the desired behavior over $\Theta$, the TTD delays and phase-shifts can be set based on the example algorithm 2400 shown in FIG. 24.

Figure 25:
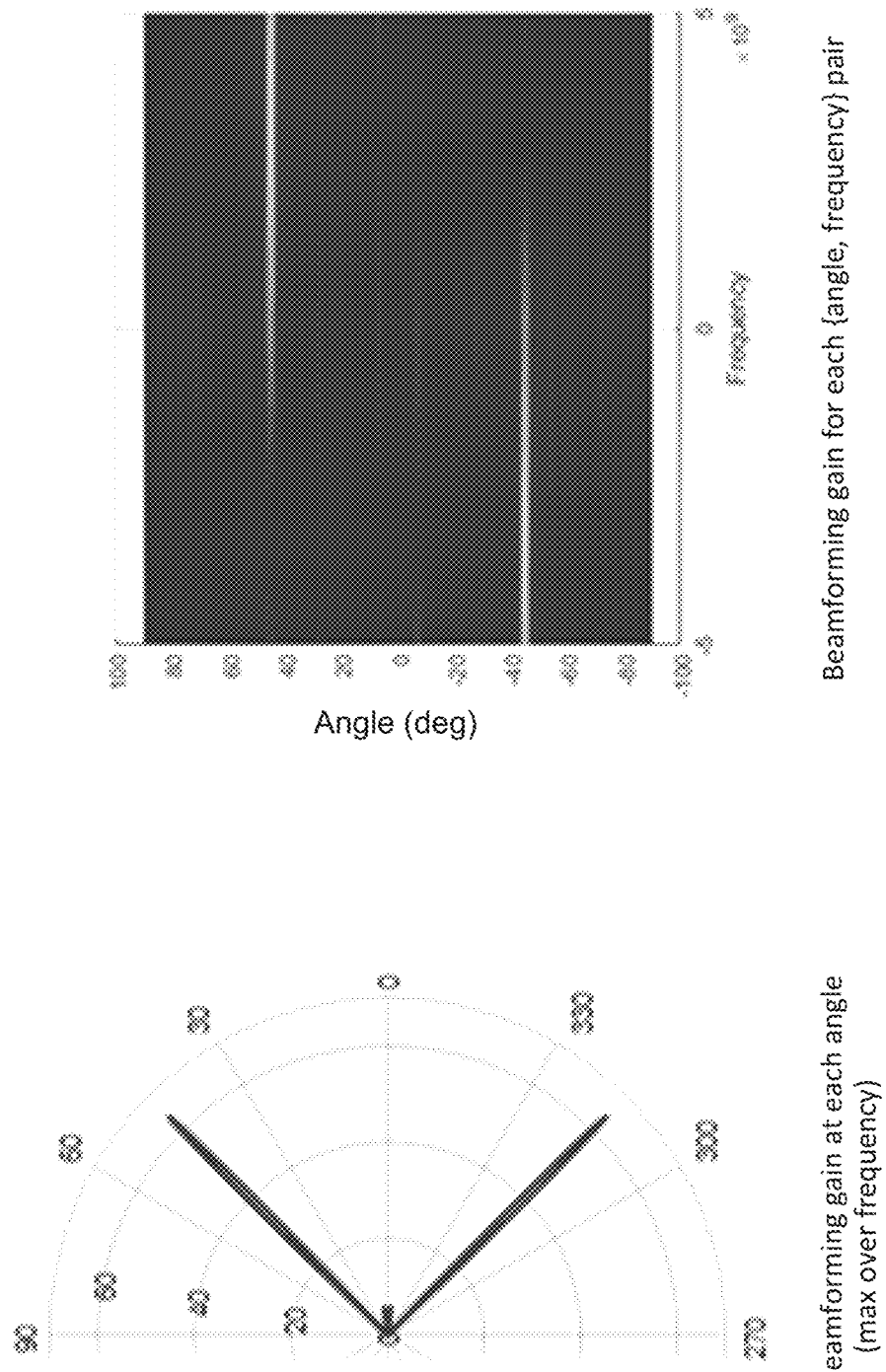
FIG. 25 illustrates charts showing the beamforming gains that can be achieved in Beam Behavior 2.

As an example, the achievable antenna gain for a TX with a half-wavelength spaced uniform linear array with M=N=64, L=1, $\theta_1=\pi/4$ and $\theta_2=-\pi/4$ is illustrated in FIG. 25. As can be seen from FIG. 25, this design can achieve the desired Beam Behavior 2, where a nearly-full beamforming gain (of 64) is achievable in the two directions on two halves of the system bandwidth. In comparison to Embodiment 4, the main difference is there can be a small side-lobe of the beam in the vicinity of θ=0.

As shown above, both the transceiver 1200 (Embodiment 1) and the transceiver 2100 (Embodiment 4) can generate the desired Beam Behavior 2. However, the transceiver 1200 may need many TTDs (albeit with small maximum required delay), and the transceiver 2100 may require many phase shifters and complex signal routing. Therefore, in another embodiment (referred to as Embodiment 5 for clarity), the number of phase shifters and TTDs is kept to a low number.

Figure 26:
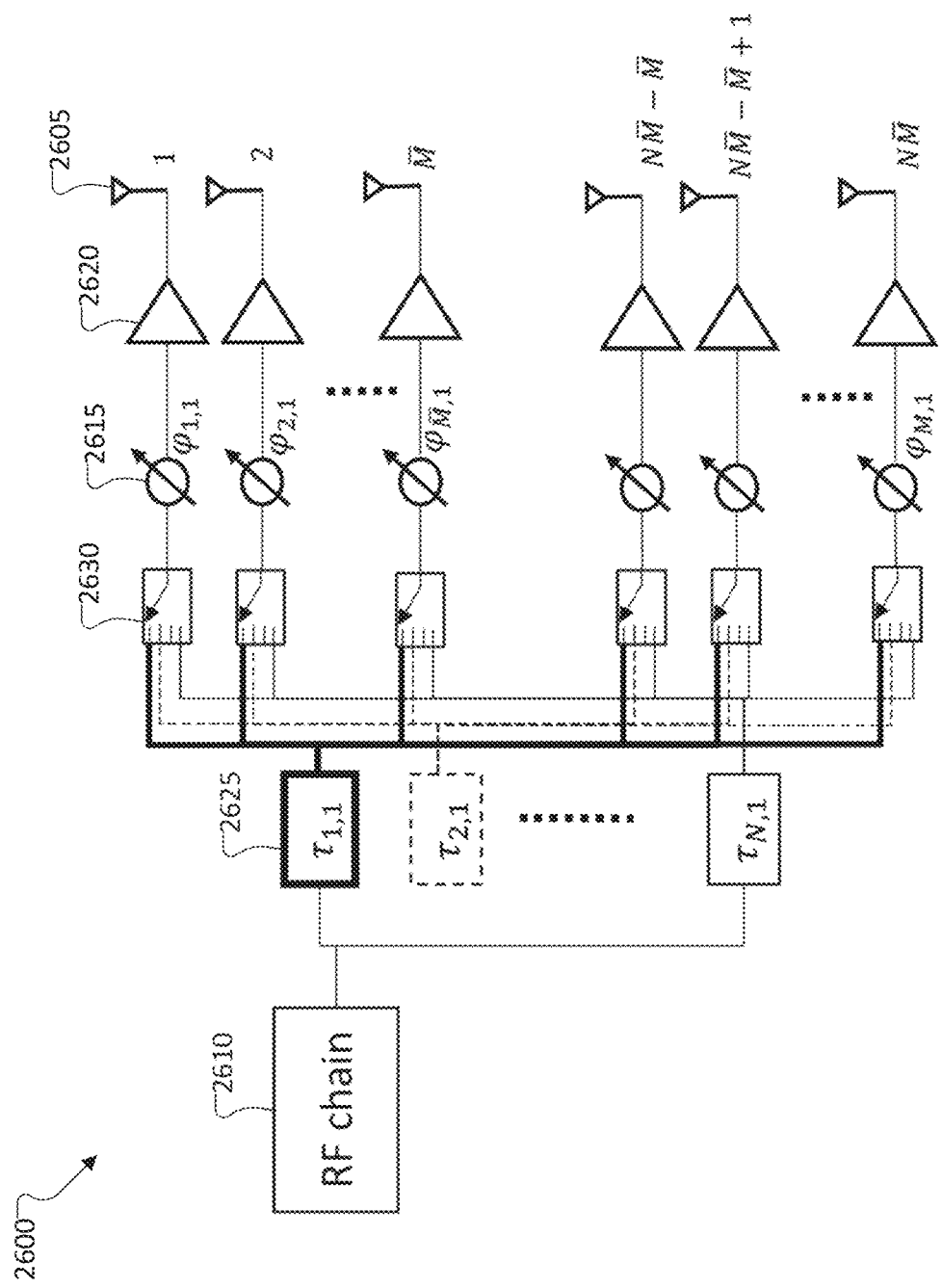
FIG. 26 illustrates another example transceiver for performing TTD-based hybrid beamforming for Behavior 2 according to embodiments of the present disclosure.

For example, FIG. 26 illustrates another example transceiver 2600 for performing TTD-based hybrid beamforming for Behavior 2 (Embodiment 5) according to embodiments of the present disclosure. As shown in FIG. 26, the transceiver 2600 includes multiple antennas 2605, a RF chain 2610, multiple phase shifters 2615, multiple amplifiers 2620, multiple TTDs 2625, and multiple switches 2630.

The transceiver 2600 is a special case of the transceiver 1100 shown in FIG. 11, with L=1, and $P_1$ being realized using the bank of switches 2630. In the transceiver 2600, the RF chain 2610 can be connected to N TTDs 2625 each having a distinct and fixed delay value: $\tau_{n,1} = 3(n-1)/[4(N-1)W]$. Each antenna 2605 also has one dedicated phase shifter 2615 and the phase shifter 2615 can be connected to any of the N fixed TTDs 2625 using the bank of switches 2630. Thus for any desired beam behavior, each antenna 2605 can be connected to one of the N fixed TTDs 2625. In some embodiments, to achieve the desired behavior over Θ, the TTD delays and phase shifts can be set based on the example algorithm 2700 shown in FIG. 27.

Figure 28:
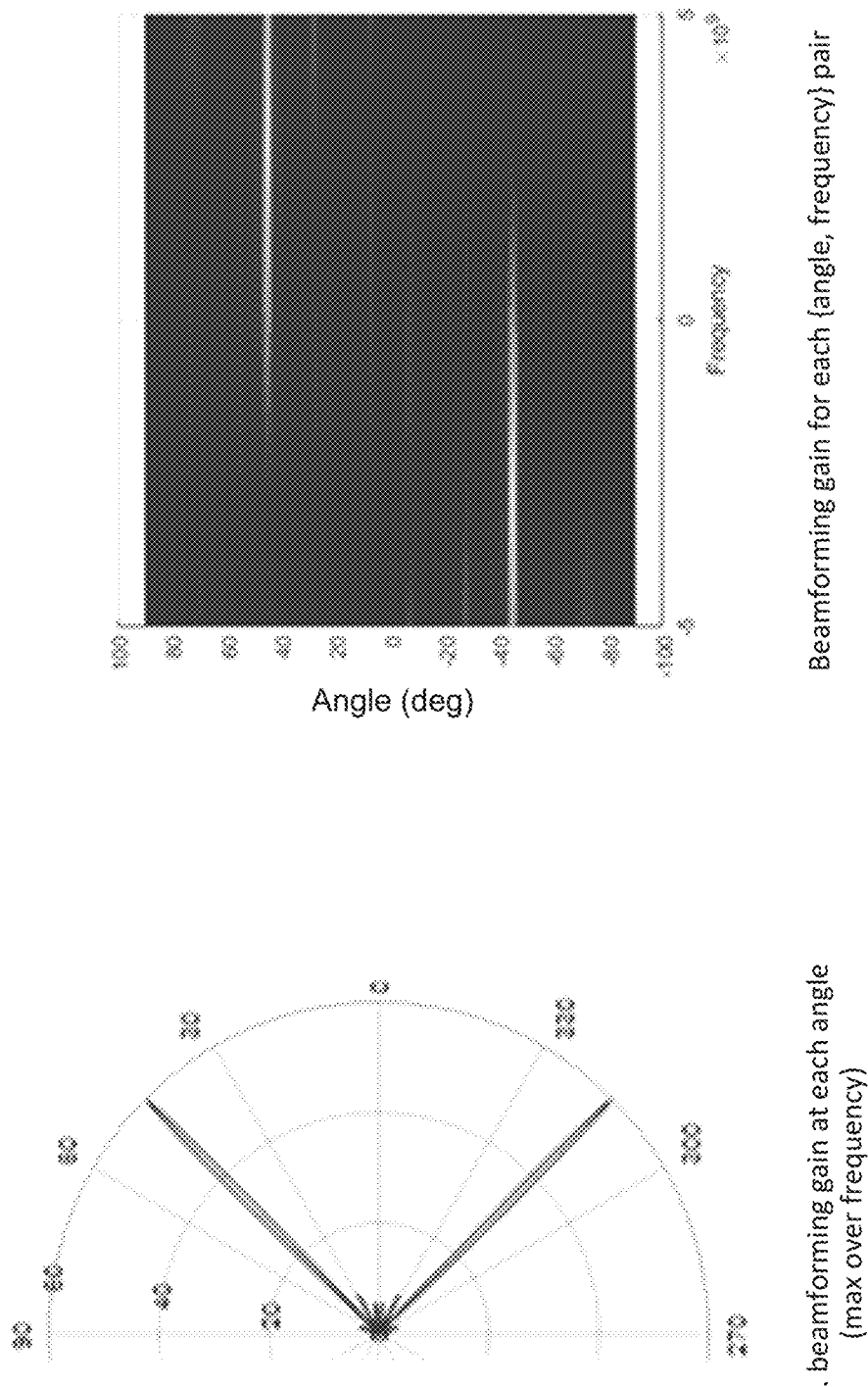
FIG. 28 illustrates charts showing the beamforming gains that can be achieved in Beam Behavior 2.

As an example, the achievable antenna gain for a TX with a half-wavelength spaced uniform linear array with M=64, N=4, $\theta_1=\pi/4$ and $\theta_2=-\pi/4$ is illustrated in FIG. 28. As can be seen from FIG. 28, the transceiver 2600 can achieve the desired Beam Behavior 2, where a nearly-full beamforming gain (of 64) is achievable in the two directions on two halves of the system bandwidth, with just four TTDs 2625. However, as with Embodiment 4, it can be seen that there can be a small side-lobe outside of the angles of interest in Θ. In some embodiments, in the transceiver 2600, instead of one RF chain, N RF chains can be used to allow for a digital implementation of the TTDs $\tau_{n,1}$.

Beam Behavior 3:

Beam Behavior 3 can be useful in scenarios where simultaneous service is required for several users that are distributed in two disjoint localized regions with the full beamforming gain, or in scenarios where link reliability and easy beam-tracking are desired. In this scenario, it is assumed without loss of generality that the desired coverage region is $\Theta = [\theta_1-\Delta\theta_1, \theta_1+\Delta\theta_1] \cup [\theta_2-\Delta\theta_2, \theta_2+\Delta\theta_2]$. In some respects, Beam Behavior 3 can be considered as a modified combination of Beam Behavior 1 and Beam Behavior 2.

Figure 29:
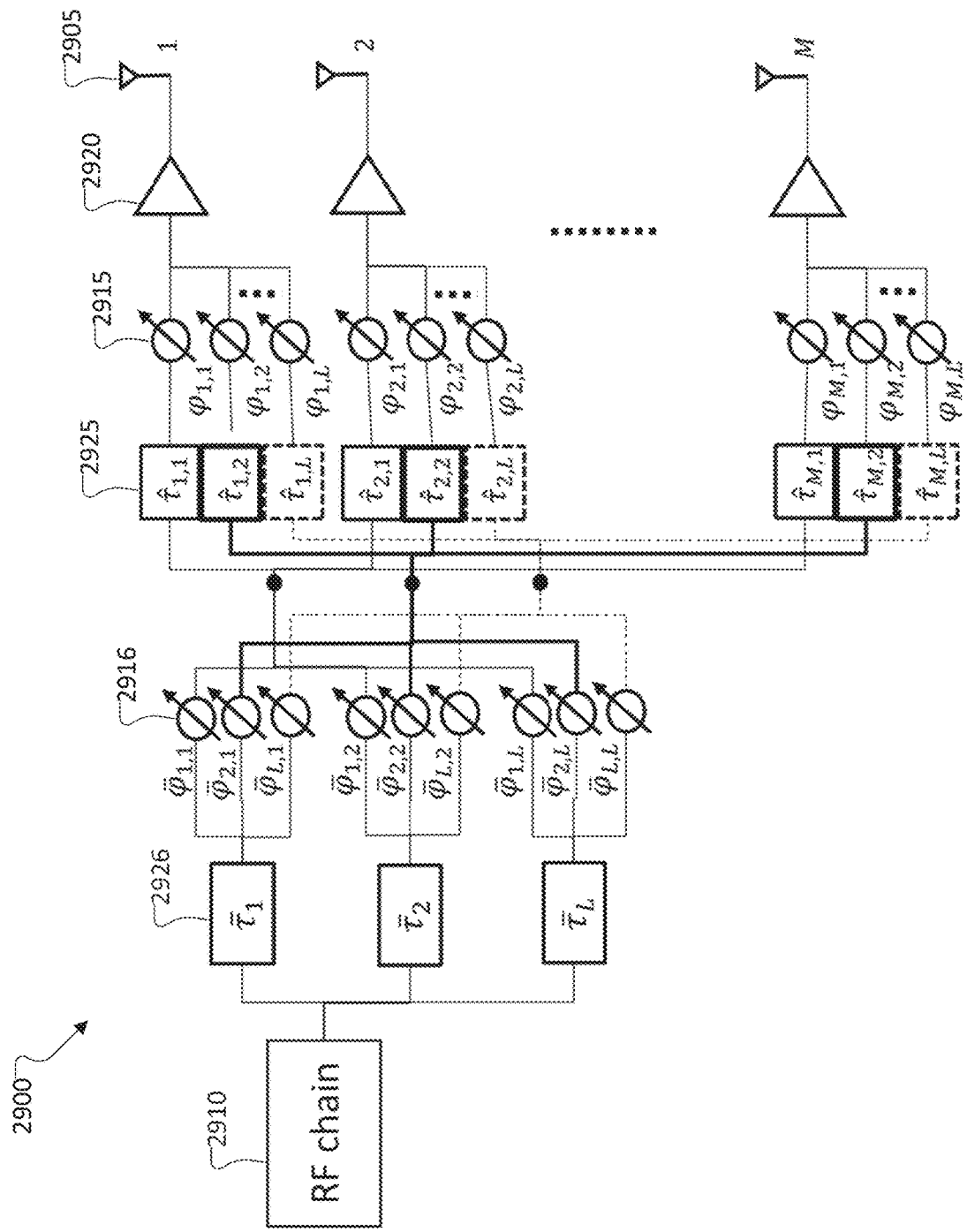
FIG. 29 illustrates an example transceiver for performing TTD-based hybrid beamforming for Beam Behavior 3 according to embodiments of the present disclosure.

FIG. 29 illustrates an example transceiver 2900 for performing TTD-based hybrid beamforming for Beam Behavior 3 (Embodiment 6) according to embodiments of the present disclosure. As shown in FIG. 29, the transceiver 2900 includes multiple antennas 2905, a RF chain 2910, multiple phase shifters 2915-2916, multiple amplifiers 2920, and multiple TTDs 2925-2926.

The architecture of the transceiver 2900 is different from the generic transceiver 1100 shown in FIG. 11, since the transceiver 2900 includes two different phase shifter arrays 2915-2916 separated by intermediary TTDs 2925. Here the signal from the RF chain 2910 is split and fed to L TTDs 2926 that can implement large delays $\{\bar{\tau}_1, \ldots, \bar{\tau}_L\}$. The outputs of the TTDs 2926 are fed to an L×L array of phase shifters 2916, with phase shifts $\{\bar{\varphi}_{1,2}, \ldots, \bar{\varphi}_{L,L}\}$, to generate L transformed signals. Similarly, each antenna 2905 (m={1, ... M}) is connected to L different phase shifters 2915, with the frequency-independent phase-shifts being $\{\varphi_{m,1}, \varphi_{m,1}, \ldots, \varphi_{m,L}\}$. Each of these phase shifters 2915 also has a dedicated TTD 2925 with delay $\hat{\tau}_{m,l}$ that can achieve a small delay range. In turn, the l-th TTDs from all the antennas 2905 are connected together and fed by the l-th transformed signal. Thus in the transceiver 2900, the number of phase shifters 2915-2916 is $ML+L^2$, and the number of TTDs 2925-2926 is ML+L, and each mapping matrix $P_l$ is a straight wire connection for each phase shifter.

In some embodiments, the TTDs 2925-2926 are reconfigurable and are designed to have a delay variation between $\bar{\tau}_l \in [0, 25(l-1)/W]$ and $\hat{\tau}_{m,L} \in [0, (m-1)\sin(\Delta\theta_{max})/W]$ for $l \in \{1, \ldots, L\}$, $m \in \{1, \ldots, M\}$, where W is the system bandwidth and $\Delta\theta_{max}$ is the maximum desired beam-sway in one direction of the center angle. In one embodiment where L=2, to achieve the desired behavior over Θ, the TTD delays and phase shifts can be set based on the example algorithm 3000 shown in FIG. 30.

Figure 31:
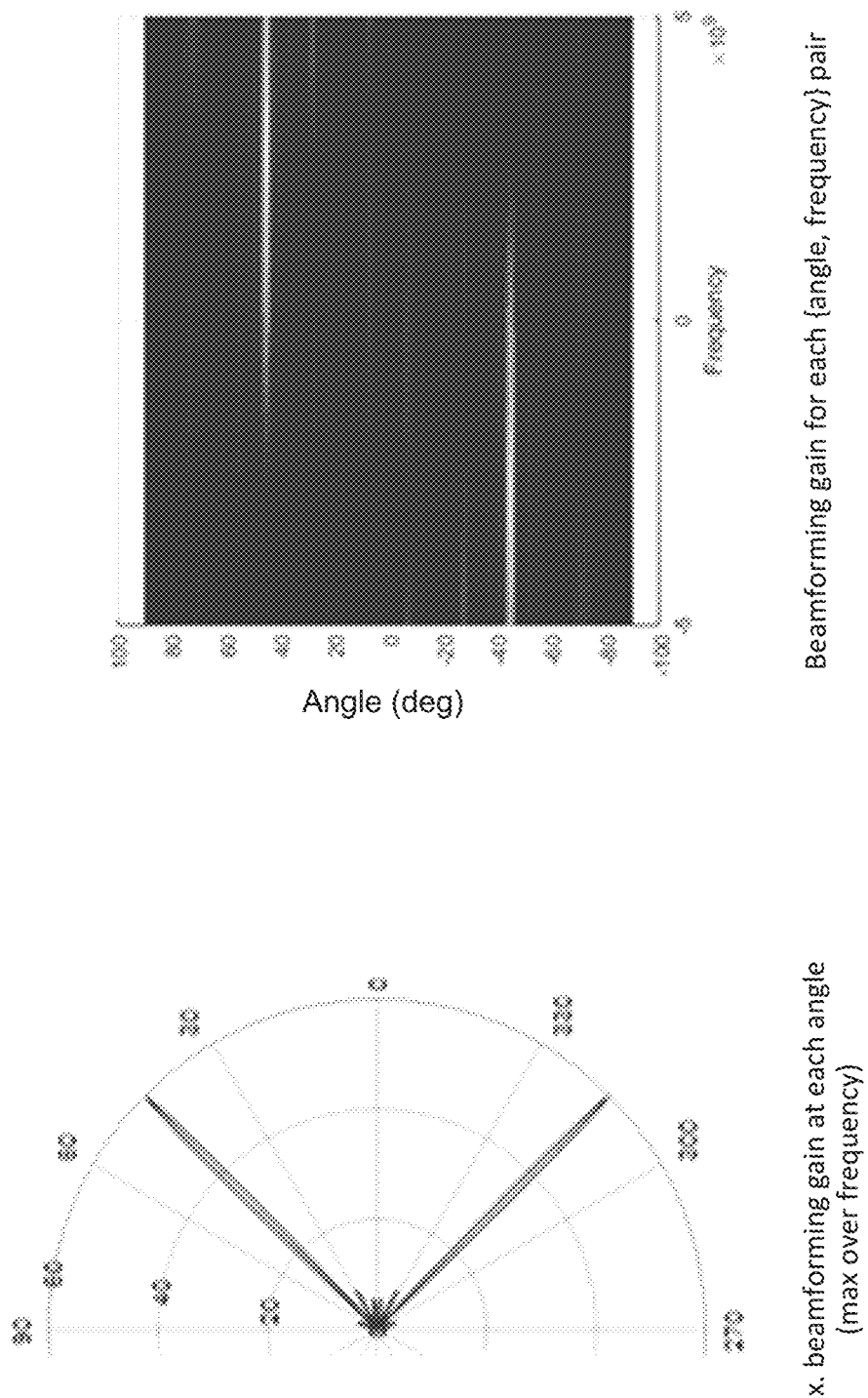
FIG. 31 illustrates charts showing the beamforming gains that can be achieved in Beam Behavior 3.

As an example, the achievable antenna gain for a TX with a half-wavelength spaced uniform linear array with M=64, L=2, $\theta_1=\pi/4$, $\Delta\theta_1=\pi/16$, $\theta_2=-\pi/4$ and $\Delta\theta_2=0$ is illustrated in FIG. 31. As can be seen from FIG. 31, the transceiver 2900 can generate the desired Beam Behavior 3, while also providing a nearly-full beamforming gain (of 64). In a related embodiment, in the transceiver 2900, instead of one RF chain 2910, L RF chains can be used to allow for a digital implementation of the TTDs $\bar{\tau}_l$.

Although the transceiver 2900 can generate the Beam Behavior 3, it may involve a large hardware cost of implementation. Therefore, in another embodiment (referred to as Embodiment 7 for clarity), to reduce the complexity, a slight relaxation of Beam Behavior 3 can be considered, where the desired coverage region is $\Theta = [\theta_1-\Delta\theta, \theta_1+\Delta\theta] \cup [\theta_2-\Delta\theta, \theta_2+\Delta\theta]$. In other words, the same squint of the beams is desired in the two angular directions: $\Delta\theta_1 = \Delta\theta_2 = \Delta\theta$.

Figure 32:
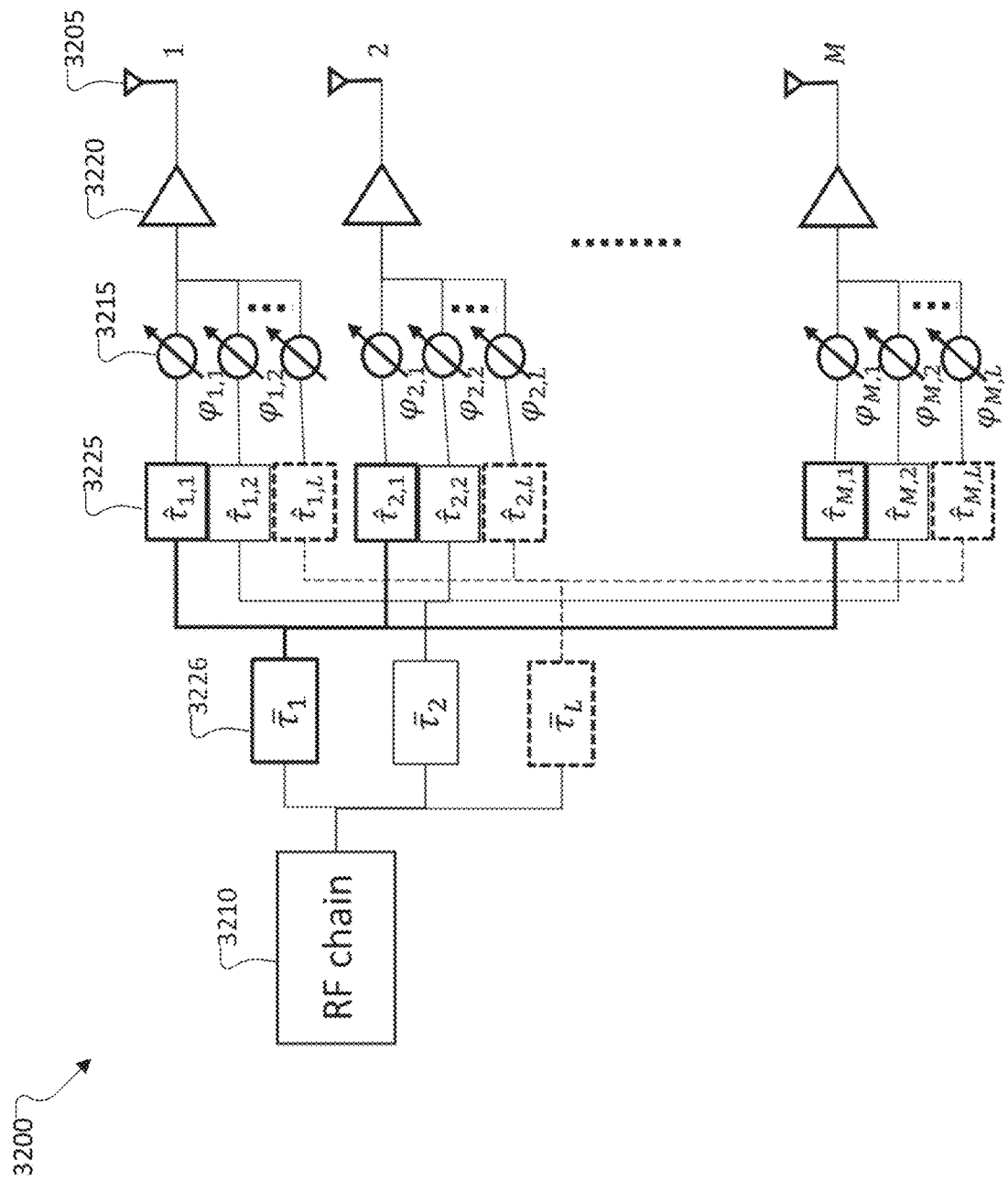
FIG. 32 illustrates another example transceiver for performing TTD-based hybrid beamforming for Behavior 3 according to embodiments of the present disclosure.

For example, FIG. 32 illustrates another example transceiver 3200 for performing TTD-based hybrid beamforming for Behavior 3 (Embodiment 7) according to embodiments of the present disclosure. As shown in FIG. 32, the transceiver 3200 includes multiple antennas 3205, a RF chain 3210, multiple phase shifters 3215, multiple amplifiers 3220, and multiple TTDs 3225-3226.

The transceiver 3200 is a special case of the transceiver 1100 shown in FIG. 11, with N=M, $P_l = \mathbb{I}_M$. Each antenna 3205 is connected to L different phase shifters 3215 with the frequency-independent phase-shifts being $\{\varphi_{m,1}, \varphi_{m,1}, \ldots, \varphi_{m,L}\}$. Each phase shifter 3215 also has a dedicated TTD 3225 with delay $\hat{\tau}_{m,l}$ that can achieve a small delay variation. In addition, the l-th TTDs 3225 from all the antennas 3205 are connected together and fed by a common TTD 3226 with larger delay rate $\bar{\tau}_l$. Thus in the transceiver 3200, the number of phase shifters 3215 is ML and number of TTDs 3225-3226 is ML+L, and each mapping matrix $P_l$ is a straight wire connection for each phase shifter 3215.

In a variant of this embodiment, the L large common TTDs 3226 can be merged with the smaller per-antenna TTDs 3225 ($\tau_{m,l} = \bar{\tau}_l + \hat{\tau}_{m,l}$) to create an architecture having only M TTDs. In some embodiments, the TTDs 3225-3226 are reconfigurable and are designed to have a delay variation between $\bar{\tau}_l \in [0, 25(l-1)/W]$ and $\hat{\tau}_{m,L} \in [0, (m-1)\sin(\Delta\theta_{max})/W]$ for $l \in \{1, \ldots, L\}$, $m \in \{1, \ldots, M\}$, where W is the system bandwidth and $\Delta\theta_{max}$ is the maximum desired beam-sway in one direction of the center angle. In one embodiment where L=2, to achieve the desired behavior over Θ, the TTD delays and phase shifts can be set based on the example algorithm 3300 shown in FIG. 33.

As an example, the achievable antenna gain for a TX with a half-wavelength spaced uniform linear array with M=64, L=2, $\theta_1=\pi/4$, $\Delta\theta=\pi/16$ and $\theta_2=-\pi/4$ is illustrated in FIG. 34. As can be seen from FIG. 34, the transceiver 3200 generate the desired relaxed Beam Behavior 3, while also providing a nearly-full beamforming gain (of 64). In a related embodiment, in the transceiver 3200, instead of one RF chain 3210, L RF chains can be used to allow for a digital implementation of the TTDs $\bar{\tau}_l$ Although the transceiver 3200 (Embodiment 7) is able to generate the relaxed Beam Behavior 3, the transceiver 3200 may still require many phase shifters 3215 (ML) and TTDs 3225-3226 (ML+L), and the corresponding routing of the phase shifters 3215 to the TTDs 3225-3226 can be complex. Therefore, the TTD-based architecture of the transceiver 1200 (Embodiment 1) can be used in conjunction with another algorithm to achieve the desired Beam Behavior 3. Note that this is a special case of the transceiver 1100 shown in FIG. 11, with L=1, N=M, $P_l=\mathbb{I}_M$. The number of phase shifters 3215 and the number of TTDs 3225-3226 are both set to M, and each mapping matrix is just a straight wire connection. In one embodiment, the TTDs 3225-3226 are reconfigurable and the TTD 3225-3226 corresponding to antenna m is designed to have a delay variation between $\tau_{m,1}\in[0,(m-1)\sin(\Delta\theta_{max})/W]$, where W is the system bandwidth. In some embodiments, to achieve the desired behavior over Θ, the TTD delays and phase-shifts can be set based on the example algorithm 3500 shown in FIG. 35.

As an example, the achievable antenna gain for a TX with a half-wavelength spaced uniform linear array with M=N=64, L=1, $\theta_1=\pi/4$, $\Delta\theta=\pi/16$ and $\theta_2=-\pi/4$ is illustrated in FIG. 36. As can be seen from FIG. 36, this design can achieve the desired relaxed Beam Behavior 3, however the achievable beamforming gain can be half the maximum (≤32).

In some scenarios, there are benefits to using fully digital chains with low resolution data converters. In such fully-digital architecture, the previously mentioned behaviors can be synthesized by applying the algorithms described herein and using digital TTDs and digital phase shifters. Also, in this fully-digital architecture, these behaviors can be implemented using only phase shifters, e.g., by applying different phase-shifts to different sub-carriers. Moreover, the previously mentioned architectures can be implemented in a hybrid digital and analog beamforming architectures. For example, in the transceiver 3200 in FIG. 32, L digital and RF chains can be used instead, then the $\bar{\tau}_l$ can be implemented as digital TTDs.

FIG. 37 illustrates a flow diagram of an example process 3700 for configuring hardware to achieve the desired beam behaviors according to embodiments of the present disclosure. Here the determination of desired beam behavior can be based on an external trigger such as a scheduler, etc.

In some embodiments, the algorithm to generate the hardware parameters can be pre-computed offline and the values stored in a dictionary. The dictionary can be based on a discretization of the acceptable parameters for the BS and the desired beam behaviors. Based on the desired behavior and the BS parameters, the corresponding hardware parameters can then be fetched from the dictionary. For example, FIG. 38 illustrates a flow diagram of an example process 3800 for configuring hardware to achieve desired beam behaviors using offline computation according to embodiments of the present disclosure.

Generic beamformer design to achieve desired beam behavior:

In some embodiments, an algorithm can be performed to design the beamformer to achieve any arbitrary desired beam behavior. For an OFDM system with subcarriers in set $\mathcal{K}$, the desired beam behavior can be defined as the set of desired beamforming vectors $\{b_k | k\in\mathcal{K}\}$. Here $b_k$ is the desired beamforming vector on OFDM subcarrier k. For example, for Beam Behavior 1, $b_k=\alpha_{tx}(\theta_1+k\Delta\theta_1/|\mathcal{K}|)$ where it is assumed that the sub-carrier index is centered. For the TTD architecture, a special case of the transceiver 1100 shown in FIG. 11 is considered, with L=1. In other words, each antenna m is connected to only one phase shifter, a power amplifier, and the corresponding frequency-independent phase-shift is $\{\varphi_m\}$. These phase shifters are connected to N TTDs with delay values $\{\tau_1, \tau_2, \ldots, \tau_N\}$ where N≤M via a mapping matrix P. The mapping matrix P essentially determines how the N TTDs connect to the corresponding M phase shifters. Thus in total, the transceiver has M phase shifters, one mapping matrix and N TTD elements. Note that for this architecture at the transmitter, assuming orthogonal frequency division multiplexing (OFDM), the transmit signal on subcarrier $k\in\mathcal{K}$ can be expressed as:

$$x_k = \frac{1}{\sqrt{M}}\begin{bmatrix} e^{j\varphi_1} \\ e^{j\varphi_2} \\ \vdots \\ e^{j\varphi_M} \end{bmatrix} \odot P \begin{bmatrix} e^{-j2\pi f_k \tau_1} \\ e^{-j2\pi f_k \tau_2} \\ \vdots \\ e^{-j2\pi f_k \tau_N} \end{bmatrix} s_k = T \odot (PD_k) s_k \quad (4)$$

where ⊙ is the Hadamard product (i.e., the element-wise matrix product), T is the phase-shifter vector, and $D_k$ is the TTD vector at subcarrier $k\in\mathcal{K}$, respectively. Here $f_k$ represents the frequency of the k-th subcarrier (including the carrier frequency). In some embodiments, the beamformer design to achieve the desired behavior $\{b_k | k\in\mathcal{K}\}$ is obtained as the solution to the problem:

$$\phi°, \tau° = \underset{\{\varphi_1,\ldots,\varphi_M\},\{\tau_1,\ldots,\tau_N\}}{\mathrm{argmax}} \sum_{k\in\mathcal{K}} \left|\bar{b}_k^\dagger T \odot (PD_k)\right| \quad (5)$$

$$= \underset{\{\varphi_1,\ldots,\varphi_M\},\{\tau_1,\ldots,\tau_N\}}{\mathrm{argmax}} \left\{\min_\psi \sum_{k\in\mathcal{K}} \mathrm{Re}\left[e^{-j\psi_k}\bar{b}_k^\dagger T \odot (PD_k)\right]\right\},$$

where $\bar{b}_k = b_k/\|b_k\|$, and auxiliary variable set $\psi=\{\psi_k | k\in\mathcal{K}\}$. In some embodiments, the solution to Equation (5) can be obtained using an iterative optimization algorithm, such as the example algorithm 3900 shown in FIG. 39.

In a variant of the algorithm 3900, the computation of $\tau_n$ inside the for loop of i can be obtained as a solution of the weighted least squares problem:

$$\underset{\tau_n,\{\varphi_m | m\in\mathcal{M}_n\}}{\mathrm{argmin}} \left\{\sum_{m\in\mathcal{M}_n}\sum_{k\in\mathcal{K}} |[\bar{b}_k]_m|[2\pi f_k\tau_n + \phi_m - \mathcal{U}(\psi_k + \angle[\bar{b}_k]_m)]^2\right\} \quad (6)$$

where $\mathcal{U}(\cdot)$ is the phase unwrapping function that for each k adds phase-shifts of integer multiples of $2\pi$ to the argument to make the argument to ensure that the phase-difference between adjacent sub-carriers satisfies:

$$|\mathcal{U}(\psi_k+\angle[\bar{b}_k]_m)-\mathcal{U}(\psi_{k-1}+\angle[\bar{b}_{k-1}]_m)|\leq\pi \quad (7)$$

Figure 40:
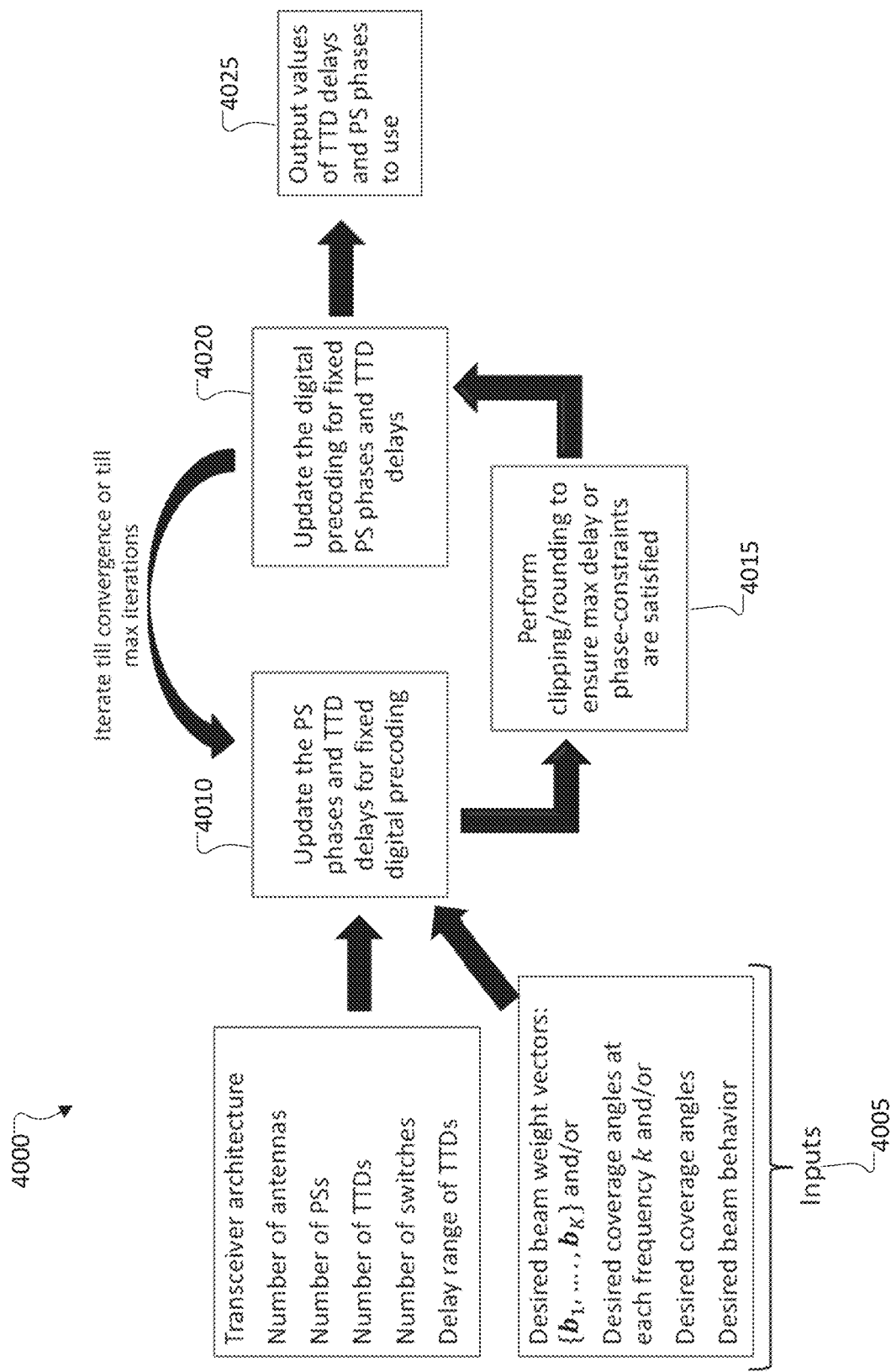
FIG. 40 illustrates an example process for determining delay values and phase shift values according to embodiments of the present disclosure.

FIG. 40 illustrates an example process 4000 for determining delay values and phase shift values according to embodiments of the present disclosure. As shown in FIG. 40, the process 4000 includes obtaining various inputs 4005. At operation 4010, one or more delay values and one or more phase shift values for fixed digital precoding are updated. At operation 4015, clipping and/or rounding are performed to ensure a maximum delay or ensure one or more phase constraints are satisfied. At operation 4020, digital precoding is updated for fixed delay values and fixed phase shift values. The operations 4010-4020 can be repeated in an iterative fashion until convergence or a maximum number of iterations is performed.

Although FIGS. 7 through 40 illustrates examples of beamforming behaviors, multiple example transceivers for performing TTD-based hybrid beamforming, and related details, various changes may be made to FIGS. 7 through 40. For example, various components in FIGS. 7 through 40 could be combined, further subdivided, or omitted and additional components could be added according to particular needs. In addition, various operations in FIGS. 7 through 40 could overlap, occur in parallel, occur in a different order, or occur any number of times. The embodiments shown in FIGS. 7 through 40 are for illustration only. Other embodiments could be used without departing from the scope of this disclosure.

The frequency-dependent hybrid beamforming architectures described herein can significantly improve the capabilities of beamforming in high frequency systems like mm-wave and THz systems. The additional capabilities can be quite useful at a base station in a wide variety use cases, and can also help make the beam alignment and tracking easier. For example, the architectures can be used to serve multiple users in disconnected regions with full beamforming gain with just one ADC at the base station.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
    determining one or more delay values and one or more phase shift values for generation of multiple desired frequency-dependent analog beams;
    configuring one or more true-time delay (TTD) elements and one or more phase shifters of a transceiver based on the one or more delay values and the one or more phase shift values, the transceiver having one or more radio-frequency (RF) chains connected to multiple antennas via the one or more TTD elements and the one or more phase shifters; and
    operating the transceiver to generate the multiple desired frequency-dependent analog beams, wherein the multiple desired frequency-dependent analog beams comprise at least one of:
        multiple beams sweeping over a coverage region as a function of frequency;
        multiple beams covering discrete angular regions on different sub-bands of a system bandwidth of the transceiver;
        multiple beams sweeping over different discrete angular regions on different sub-bands; or
        multiple beams covering a broadcast area at multiple frequencies, wherein for a portion of the multiple frequencies, the multiple beams do not cover a portion of the broadcast area.

2. The method of claim 1, wherein the one or more TTD elements of the transceiver comprise at least one of:
    one TTD element for each of the multiple antennas;
    a first TTD element for each of the multiple antennas and a second TTD element that is shared by at least a subset of the multiple antennas, wherein a time delay of the first TTD elements is smaller than a time delay of the second TTD element;
    a first TTD element for a first subset of the multiple antennas and a second TTD element for a second subset of the multiple antennas; and
    multiple TTD elements for each of the multiple antennas.

3. The method of claim 2, wherein the one or more phase shifters of the transceiver comprise at least one of:
    at least one phase shifter for each of the multiple antennas;
    one phase shifter and one switch for each of the multiple antennas; and
    multiple phase shifters for each of the multiple antennas.

4. The method of claim 2, wherein the transceiver further comprises:
    a switch for each of the multiple antennas, wherein each switch is communicatively coupled between one of the TTD elements and one of the phase shifters.

5. The method of claim 1, wherein the one or more delay values and the one or more phase shift values are determined using an algorithm that comprises:
    updating the one or more delay values and the one or more phase shift values for fixed digital precoding;
    performing at least one of clipping or rounding to ensure a maximum delay or one or more phase constraints are satisfied;
    updating digital precoding for fixed delay values and fixed phase shift values; and
    repeating the updating, performing, and updating in an iterative fashion until convergence or a maximum number of iterations is performed.

6. The method of claim 5, wherein the algorithm receives, as input, at least one of:
    one or more desired beam weight vectors;
    one or more desired coverage angles at each of multiple frequencies; and
    one or more desired beam behaviors.

7. The method of claim 1, wherein the one or more phase shifters of the transceiver comprise at least one phase shifter for each of the multiple antennas.

8. A device comprising:
    a transceiver comprising:
        multiple antennas,
        one or more true-time delay (TTD) elements,
        one or more phase shifters, and
        one or more radio-frequency (RF) chains connected to the multiple antennas via the one or more TTD elements and the one or more phase shifters; and
    a processor operably connected to the transceiver, the processor configured to:
        determine one or more delay values and one or more phase shift values for generation of multiple desired frequency-dependent analog beams;
        configure the one or more TTD elements and the one or more phase shifters based on the one or more delay values and the one or more phase shift values; and control the transceiver to generate the multiple desired frequency-dependent analog beams, wherein the multiple desired frequency-dependent analog beams comprise at least one of:
  multiple beams sweeping over a coverage region as a function of frequency;
  multiple beams covering discrete angular regions on different sub-bands of a system bandwidth of the transceiver;
  multiple beams sweeping over different discrete angular regions on different sub-bands; or
  multiple beams covering a broadcast area at multiple frequencies, wherein for a portion of the multiple frequencies, the multiple beams do not cover a portion of the broadcast area.

9. The device of claim 8, wherein the one or more TTD elements of the transceiver comprise at least one of:
  one TTD element for each of the multiple antennas;
  a first TTD element for each of the multiple antennas and a second TTD element that is shared by at least a subset of the multiple antennas, wherein a time delay of the first TTD elements is smaller than a time delay of the second TTD element;
  a first TTD element for a first subset of the multiple antennas and a second TTD element for a second subset of the multiple antennas; and
  multiple TTD elements for each of the multiple antennas.

10. The device of claim 9, wherein the one or more phase shifters of the transceiver comprise at least one of:
  at least one phase shifter for each of the multiple antennas;
  one phase shifter and one switch for each of the multiple antennas; and
  multiple phase shifters for each of the multiple antennas.

11. The device of claim 9, wherein the transceiver further comprises:
  a switch for each of the multiple antennas, wherein each switch is communicatively coupled between one of the TTD elements and one of the phase shifters.

12. The device of claim 8, wherein the processor is configured to determine the one or more delay values and the one or more phase shift values using an algorithm that causes the processor to:
  update the one or more delay values and the one or more phase shift values for fixed digital precoding;
  perform at least one of clipping or rounding to ensure a maximum delay or one or more phase constraints are satisfied;
  update digital precoding for fixed delay values and fixed phase shift values; and
  repeat the update, perform, and update in an iterative fashion until convergence or a maximum number of iterations is performed.

13. The device of claim 12, wherein the algorithm receives, as input, at least one of:
  one or more desired beam weight vectors;
  one or more desired coverage angles at each of multiple frequencies; and
  one or more desired beam behaviors.

14. The device of claim 8, wherein the one or more phase shifters of the transceiver comprise at least one phase shifter for each of the multiple antennas.

15. A non-transitory computer readable medium comprising program code that, when executed by a processor of a device, causes the device to:
  determine one or more delay values and one or more phase shift values for generation of multiple desired frequency-dependent analog beams;
  configure one or more true-time delay (TTD) elements and one or more phase shifters of a transceiver based on the one or more delay values and the one or more phase shift values, the transceiver having one or more radio-frequency (RF) chains connected to multiple antennas via the one or more TTD elements and the one or more phase shifters; and
  operate the transceiver to generate the multiple desired frequency-dependent analog beams, wherein the multiple desired frequency-dependent analog beams comprise at least one of:
    multiple beams sweeping over a coverage region as a function of frequency;
    multiple beams covering discrete angular regions on different sub-bands of a system bandwidth of the transceiver;
    multiple beams sweeping over different discrete angular regions on different sub-bands; or
    multiple beams covering a broadcast area at multiple frequencies, wherein for a portion of the multiple frequencies, the multiple beams do not cover a portion of the broadcast area.

16. The non-transitory computer readable medium of claim 15, wherein the one or more TTD elements of the transceiver comprise at least one of:
  one TTD element for each of the multiple antennas;
  a first TTD element for each of the multiple antennas and a second TTD element that is shared by at least a subset of the multiple antennas, wherein a time delay of the first TTD elements is smaller than a time delay of the second TTD element;
  a first TTD element for a first subset of the multiple antennas and a second TTD element for a second subset of the multiple antennas; and
  multiple TTD elements for each of the multiple antennas.

17. The non-transitory computer readable medium of claim 16, wherein the one or more phase shifters of the transceiver comprise at least one of:
  at least one phase shifter for each of the multiple antennas;
  one phase shifter and one switch for each of the multiple antennas; and
  multiple phase shifters for each of the multiple antennas.

18. The non-transitory computer readable medium of claim 16, wherein the transceiver further comprises:
  a switch for each of the multiple antennas, wherein each switch is communicatively coupled between one of the TTD elements and one of the phase shifters.

19. The non-transitory computer readable medium of claim 15, wherein the one or more delay values and the one or more phase shift values are determined using an algorithm that causes the device to:
  update the one or more delay values and the one or more phase shift values for fixed digital precoding;
  perform at least one of clipping or rounding to ensure a maximum delay or one or more phase constraints are satisfied;
  update digital precoding for fixed delay values and fixed phase shift values; and
  repeat the update, perform, and update in an iterative fashion until convergence or a maximum number of iterations is performed.

20. The non-transitory computer readable medium of claim 15, wherein the one or more phase shifters of the transceiver comprise at least one phase shifter for each of the multiple antennas.

* * * * *